(12) United States Patent
Endo et al.

(10) Patent No.: US 9,108,520 B2
(45) Date of Patent: Aug. 18, 2015

(54) VEHICLE AND CONTROL METHOD FOR VEHICLE

(75) Inventors: Hiroki Endo, Nissin (JP); Masaya Yamamoto, Kasugai (JP); Itaru Seta, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 60 days.

(21) Appl. No.: 13/983,065

(22) PCT Filed: Feb. 3, 2011

(86) PCT No.: PCT/JP2011/052222
§ 371 (c)(1),
(2), (4) Date: Aug. 1, 2013

(87) PCT Pub. No.: WO2012/105017
PCT Pub. Date: Aug. 9, 2012

(65) Prior Publication Data
US 2013/0311026 A1 Nov. 21, 2013

(51) Int. Cl.
*B60L 9/00* (2006.01)
*B60L 11/00* (2006.01)
*G05D 1/00* (2006.01)
*G05D 3/00* (2006.01)
*G06F 17/00* (2006.01)
*B60L 11/18* (2006.01)
*B60L 3/00* (2006.01)
*B60L 3/04* (2006.01)
*B60L 15/20* (2006.01)

(52) U.S. Cl.
CPC ........... *B60L 11/1803* (2013.01); *B60L 3/0046* (2013.01); *B60L 3/04* (2013.01); *B60L 15/20* (2013.01); *B60L 2210/10* (2013.01); *B60L 2210/14* (2013.01); *B60L 2240/547* (2013.01); *B60L 2240/549* (2013.01); *Y02T 10/7005* (2013.01); *Y02T 10/7216* (2013.01); *Y02T 10/7225* (2013.01); *Y02T 10/7275* (2013.01)

(58) Field of Classification Search
CPC ..... B60L 11/1803; B60L 3/0046; B60L 3/04; B60L 15/20
USPC .......................................................... 701/22
See application file for complete search history.

(56) References Cited

U.S. PATENT DOCUMENTS

| | | | |
|---|---|---|---|
| 2006/0161328 A1* | 7/2006 | Hoshiba et al. | 701/84 |
| 2007/0200521 A1* | 8/2007 | Ochiai et al. | 318/376 |
| 2010/0026222 A1* | 2/2010 | Yoshida et al. | 318/400.22 |

FOREIGN PATENT DOCUMENTS

| | | |
|---|---|---|
| JP | 10-313592 | 11/1998 |
| JP | 2006-94691 | 4/2006 |
| JP | 2009-160953 | 7/2009 |
| JP | 2010-41741 | 2/2010 |

* cited by examiner

*Primary Examiner* — Imran Mustafa
(74) *Attorney, Agent, or Firm* — Finnegan, Henderson, Farabow, Garrett & Dunner, LLP

(57) ABSTRACT

An ECU executes a program including the steps of: executing addition processing when current IB is equal to or more than a current upper limit value IB(0) and there is a divergence between command power Pc and an upper limit value Woutf of an allowable range of electric power at the time of agreement between the current IB and the current upper limit value IB(0); and executing normal Woutf determination processing when the current IB is less than the current upper limit value IB(0) or there is no divergence between the command power Pc and the upper limit value Woutf at the time of agreement between the current IB and the current upper limit value IB(0).

7 Claims, 23 Drawing Sheets

VEHICLE AND CONTROL METHOD FOR VEHICLE

CROSS-REFERENCE TO RELATED APPLICATIONS

This application is a national phase application of International Application No. PCT/JP2011/052222, filed Feb. 3, 2011, the content of which is incorporated herein by reference.

TECHNICAL FIELD

The present invention relates to control over a vehicle equipped with a rotating electric machine and a power storage device.

BACKGROUND ART

Japanese Patent Laying-Open No. 2006-094691 (PTL 1) discloses a technology for suppressing excessive charging/discharging at a battery by changing an input/output limit value more rapidly than in normal time.

CITATION LIST

Patent Literature

PTL 1: Japanese Patent Laying-Open No. 2006-094691

SUMMARY OF INVENTION

Technical Problem

In some cases, an allowable range of voltage and/or current is restricted by a factor such as protection of components. Therefore, there is a case where even if input/output power of a battery is within a range from an upper limit value to a lower limit value, a voltage and/or current goes beyond an allowable range. In such a case, it is necessary to change an input/output limit value more rapidly such that the input/output limit value is an appropriate value. As to a motive power output apparatus disclosed in the above-indicated publication, no consideration is given to such a problem, and the problem cannot be solved.

An object of the present invention is to provide a vehicle and a control method for a vehicle which change an input/output limit value more rapidly so that a voltage and/or current does not go beyond an allowable range.

Solution to Problem

A vehicle according to an aspect of the present invention includes a rotating electric machine for generating driving force for the vehicle; a power storage device for supplying and receiving electric power to and from the rotating electric machine; a detection unit for detecting a physical quantity of at least any one of a voltage and current of the power storage device; and a control unit for controlling the vehicle such that required electric power required of the rotating electric machine is satisfied within an allowable range of electric power allowed to be input to and output from the power storage device. The allowable range of electric power ranges between a first boundary value and a second boundary value. The control unit brings a corresponding boundary value corresponding to the required electric power and being one of the first and second boundary values into agreement with the required electric power when there is a divergence between the corresponding boundary value and the required electric power at a first point in time when the physical quantity detected by the detection unit agrees with a limit value.

Preferably, the corresponding boundary value is an upper limit value of the allowable range of electric power when, at the first point in time, an electric power difference between the required electric power and the corresponding boundary value has a magnitude not less than a predetermined value and the required electric power has a positive value. The corresponding boundary value is a lower limit value of the allowable range of electric power when, at the first point in time, the electric power difference has a magnitude not less than the predetermined value and the required electric power has a negative value.

More preferably, the control unit determines a first correction amount and a second correction amount for an upper limit value and a lower limit value, respectively, of the allowable range of electric power based on a deviation between the physical quantity and the limit value and determines any one of the upper limit value and the lower limit value of the allowable range of electric power depending on the determined first and second correction amounts and on a charging/discharging limit value based on a state of the power storage device. The control unit sets the second correction amount to zero when determining the required electric power at the first point in time as the upper limit value. The control unit sets the first correction amount to zero when determining the required electric power at the first point in time as the lower limit value.

Further preferably, the control unit brings the corresponding boundary value into agreement with the required electric power when there is a divergence between the corresponding boundary value and the required electric power at the first point in time when a first computed value computed using a first coefficient expressing a weight for reflecting the physical quantity detected by the detection unit in a previous value, agrees with the limit value. The control unit determines a correction amount for the corresponding boundary value based on a deviation between a second computed value computed using a second coefficient expressing a weight for reflecting the physical quantity detected by the detection unit in the previous value, and the limit value. The first coefficient is a value having a greater weight than the second coefficient.

Further preferably, the control unit predicts, from an amount of change in the physical quantity, the first point in time that is a predetermined period of time ahead, and when there is a divergence between the corresponding boundary value and a predicted value of the required electric power at the predicted first point in time, the control unit brings the corresponding boundary value into agreement with the predicted value the predetermined period of time prior to the first point in time.

Further preferably, the detection unit is connected in a manner to be able to communicate with the control unit and outputs a signal indicating the detected physical quantity to the control unit. The predetermined period of time is a period of time based on a delay in communication between the detection unit and the control unit.

A control method for a vehicle according to another aspect of the present invention is a control method for a vehicle used for a vehicle equipped with a rotating electric machine for generating drive force and a power storage device for supplying and receiving electric power to and from the rotating electric machine. The method includes the steps of: detecting a physical quantity of at least any one of a voltage and current of the power storage device; controlling the vehicle such that required electric power required of the rotating electric machine is satisfied within an allowable range of electric power allowed to be input to and output from the power storage device; and bringing a corresponding boundary value corresponding to the required electric power and being one of a first boundary value and a second boundary value of the allowable range of electric power into agreement with the required electric power when there is a divergence between the corresponding boundary value and the required electric power at a first point in time when the physical quantity agrees with a limit value.

Advantageous Effects of Invention

According to the present invention, a change in current and voltage of a power storage device beyond a limit value can be suppressed by bringing a boundary value of an allowable range of electric power into agreement with required electric power at the time of agreement of a physical quantity of at least any one of the current and the voltage agrees with the limit value. Therefore, a vehicle and a control method for a vehicle which change an input/output limit value more rapidly so that a voltage and/or current does not go beyond an allowable range can be provided.

DESCRIPTION OF EMBODIMENTS

Figure 1:
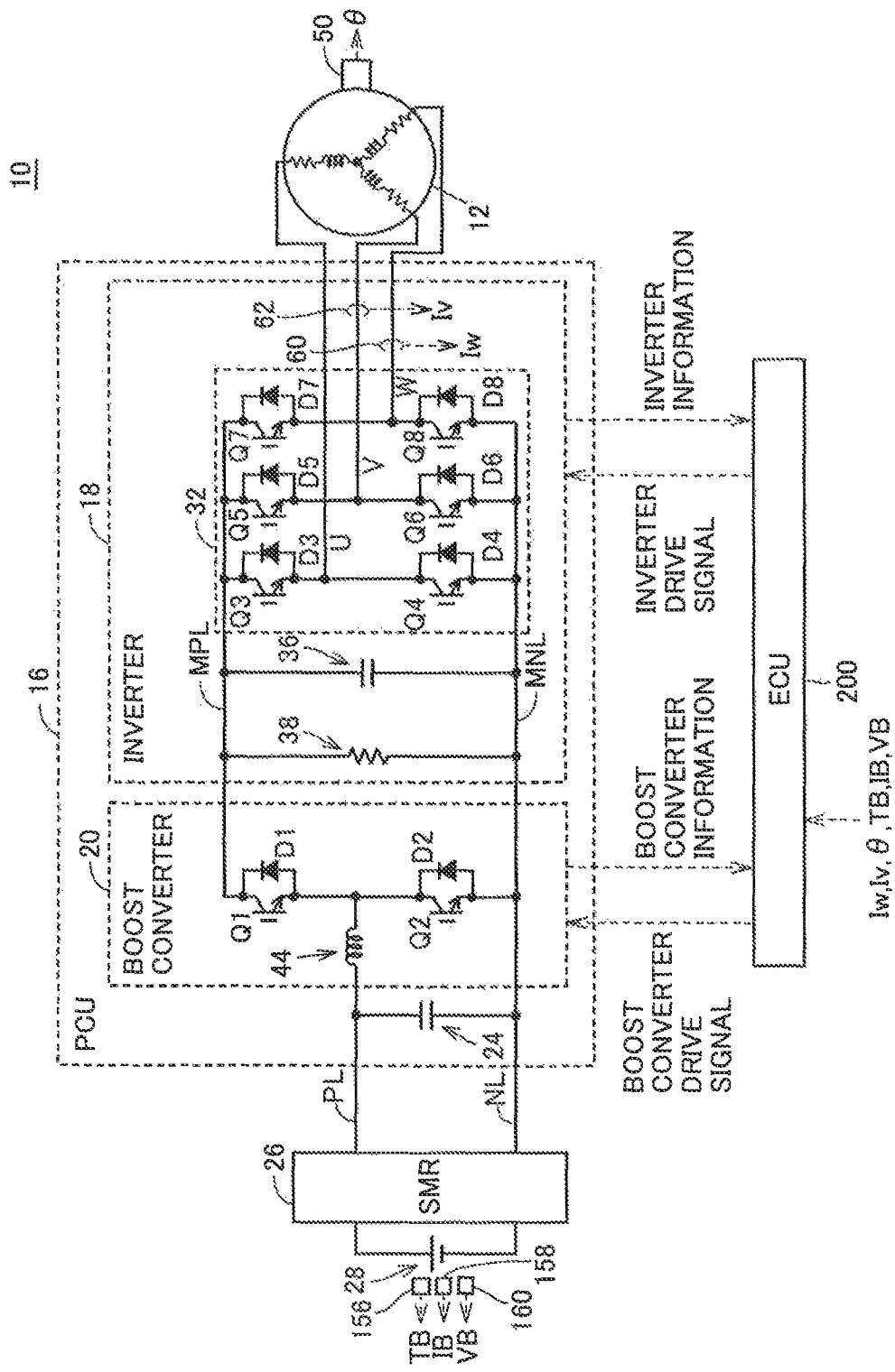
FIG. 1 is a block diagram showing an overall configuration of a vehicle according to a first embodiment.

Embodiments of the present invention will be described hereinafter with reference to the drawings. In the description below, the same components have the same reference characters allotted. They also have the same names and functions. Therefore, a detailed description thereof will not be repeated.

First Embodiment

As shown in FIG. 1, a vehicle 10 according to the present embodiment is an electric vehicle and includes a motor generator (hereinafter referred to as MG) 12, a power control unit 16 (hereinafter referred to as PCU 16), a system main relay (hereinafter referred to as SMR) 26, a main battery 28, and an ECU (Electronic Control Unit) 200. PCU 16 includes an inverter 18 and a boost converter 20.

A rotation shaft of MG 12 is linked to a drive shaft for rotating drive wheels. That is, vehicle 10 travels powered by drive force from MG 12.

MG 12 is, for example, a three-phase AC rotating electric machine with a rotor in which a permanent magnet is embedded. MG 12 includes three stator coils of U-, V-, W-phases, respectively. The three stator-coils of U-, V-, W-phases of MG 12 each have one end connected together to a neutral point. Each phase has the other end connected to an intermediate point of switching elements of upper and lower arms of each phase.

MG 12 generates drive force using electric power supplied from inverter 18. The drive force of MG 12 is transmitted to drive wheels. It is noted that, for example, during braking vehicle 10, drive wheels drive MG 12 and MG 12 operates as a generator. In this way, MG 12 operates as a regenerative brake which converts braking energy into electric power. Electric power generated by MG 12 is supplied to main battery 28 via inverter 18 and boost converter 20.

Main battery 28 is a rechargeable DC power supply and is, for example, a nickel metal hydride battery, a lithium ion battery, or a similar a secondary battery or a capacitor of large capacity, or the like.

It is noted that in the present embodiment, a description is given of a case where main battery 28 is mounted on vehicle 10 as a main power supply, but not particularly limited to such a configuration. For instance, in addition to main battery 28, one or more sub batteries may be mounted on vehicle 10.

Main battery 28 is provided with a battery temperature sensor 156 for detecting a battery temperature TB of main battery 28, a current sensor 158 for detecting current IB of main battery 28, and a voltage sensor 160 for detecting a voltage VB of main battery 28.

Battery temperature sensor 156 sends a signal indicating battery temperature TB to ECU 200. Current sensor 158 sends a signal indicating current IB to ECU 200. Voltage sensor 160 sends a signal indicating voltage VB to ECU 200.

It is noted that ECU 200 may calculate, as measurements, a mean Value during a predetermined period of actually measured values of at least one physical quantity of the received battery temperature TB, current IB, and voltage VB, or may calculate, as measurements, the minimal value during a predetermined period of actually measured values of the at least one physical quantity.

ECU 200 controls the operations of inverter 18 and boost converter 20 through software processing by executing a pre-stored program with a CPU (Central Processing Unit) not shown in the drawings and/or through hardware processing with a dedicated electronic circuit.

Inverter 18 includes an IPM (Intelligent Power Module) 32, a second condenser 36, a discharging resistance 38, and current sensors 60, 62. IPM 32 is connected in parallel with each other to a first power line MPL and a first earth line MNL. IPM 32 converts DC power supplied from boost converter 20 into AC power and outputs the AC power to MG 12.

Further, IPM 32 converts AC power generated at MG 12 into DC power and outputs the DC power to boost converter 20. It is noted that IPM 32 is formed of, for example, a bridge circuit including switching elements corresponding to the three phases.

IPM 32 includes upper and lower arms of U-, V-, W-phases. Upper and lower arms of each phase are connected in parallel with each other between first power line MPL and first earth line MNL. Upper and lower arms of each phase include switching elements connected in series between first power line MPL and first earth line MNL.

For instance, upper and lower arms of the U-phase include switching elements Q3, Q4. Upper and lower arms of the V-phase include switching elements Q5, Q6. Upper and lower arms of the W-phase include switching elements Q7, Q8. Antiparallel diodes D3-D8 are connected to switching elements Q3-Q8, respectively. ON/OFF of switching elements Q3-Q8 is controlled by an inverter drive signal from ECU 200.

Switching elements Q3-Q8 are, for example, implemented by a power semiconductor switching element such as an IGBT (Insulated Gate Bipolar Transistor), a power MOS (Metal Oxide Semiconductor) transistor, or a power bipolar transistor.

IPM 32 drives MG 12 by performing a switching operation in response to the inverter driving signal from ECU 200.

Current sensors 60, 62 are connected to ECU 200. Current sensors 60, 62 detect motor current (phase current) of each phase flowing through MG 12. Current sensors 60, 62 output detected motor current of each phase to ECU 200. It is noted that since the sum of instantaneous values of three-phase current is zero, current sensors 60, 62 detect motor current corresponding to two phases of MG 12. ECU 200 calculates motor current corresponding to the remaining one phase from the detected motor current corresponding to two phases. In the present embodiment, current sensor 60 detects current Iw of the W-phase of the three phases of MG 12 and outputs a signal indicating the detected current Iw to ECU200. Current sensor 62 detects current Iv of the V-phase of MG 12 and outputs a signal indicating the detected current Iv to ECU 200.

A resolver 50 is connected to ECU 200. Resolver 50 detects a rotation angle θ of a rotation shaft of MG 12 and outputs the detected rotation angle θ to ECU 200. ECU 200 can calculate the rotational speed and the angular velocity ω (rad/s) of MG 12 based on rotation angle θ.

It is noted that resolver 50 may not be arranged for the sake of simplicity when rotation angle θ is directly computed at ECU 200 from a motor voltage and/or current.

ECU 200 receives inverter information from inverter 18. Inverter information includes, for example, information on at least one of the temperature of inverter 18, the voltage and current of boost converter 20 side, and the current of each phase supplied to MG 12. Inverter 18 is provided with various sensors (not shown) for obtaining the above-described inverter information.

Main battery 28 is connected to boost converter 20 via SMR 26. Main battery 28 is connected to one end of a second power line PL and one end of a second earth line NL. The other end of second power line PL and the other end of second earth line NL are connected to boost converter 20.

SMR 26 makes a switch from one state of a conducting state and an interrupted state to the other state, based on a control signal from ECU 200. The conducting state is a state in which main battery 28 and the boost converter are electrically connected together. The interrupted state is a state in which main battery 28 and boost converter 20 are electrically interrupted from each other.

Boost converter 20 is connected to first power line MPL and first earth line MNL. Boost converter 20 performs conversion of voltage between main battery and first power line MPL and first earth line MNL, based on a boost converter drive signal from ECU 200.

ECU 200 receives boost converter information from boost converter 20. The boost converter information includes, for example, information on at least one of the temperature of the boost converter, the voltage and current of the inverter 18 side, the voltage and current of the main battery 28 side, and the current flowing through a reactor 44. Boost converter 20 is provided with various sensors (not shown) for obtaining the above-described boost converter information.

ECU 200 determines a target voltage based on the boost converter information from boost converter 20 and on the state of electrical equipment mounted on vehicle 10 (for example, a state in which an A/C compressor is starting to operate). ECU 200 controls boost converter 20 such that the voltage of main battery 28 changes to the determined target voltage. In some cases, a target voltage is set such that, for example, an increase in voltage is zero.

Boost converter 20 includes switching elements Q1, Q2, diodes D1, D2, and reactor 44. Switching elements Q1, Q2 are connected in series with each other between first power line MPL and first earth line MNL. Switching elements Q1, Q2 are implemented by, for example, a power semiconductor switching element such as an IGBT (Insulated Gate Bipolar Transistor), a power MOS (Metal Oxide Semiconductor) transistor, or a power bipolar transistor.

Reactor 44 is configured of an annular core part and a coil wound around the outer circumference of the core part. One end of the coil of reactor 44 is connected to a positive terminal of main battery 28 via first power line MPL. The other end of the coil of reactor 44 is connected to a connection node between switching element Q1 and switching element Q2.

Diode D1 is connected in anti-parallel to switching element Q1. That is, diode D1 is connected in parallel to switching element Q1 in a manner to have its forward direction in the direction toward first power line MPL.

Diode D2 is connected in anti-parallel to switching element Q2. That is, diode D2 is connected in parallel to switching element in a manner to have its forward direction in the direction toward reactor 44.

Switching elements Q1, Q2 of boost converter 20 are controlled based on the boost converter drive signal (duty signal) from ECU 200 such that they are in opposite states to each other (that is, when Q1 is ON, Q2 is OFF, when Q1 is OFF, Q2 is ON). An alternate repeat of a Q1 ON period (Q2 OFT period) and a Q2ON period (Q1 OFF period) controls the voltage across first power line MPL and first earth line MNL to be not less than the output voltage of main battery 28.

A first condenser 24 is connected between second power line PL and second earth line NL. First condenser 24 reduces an AC component in the DC voltage across second power line PL and second earth line NL. Second condenser 36 is connected between first power line MPL and first earth line MNL. Second condenser 36 reduces an electric power fluctuation component in first power line MPL and first earth line MNL.

In a vehicle having a configuration as above, ECU 200 calculates a vehicle required power Pm based on signals detected by sensors such as a vehicle speed sensor, an accelerator position sensor, and a sensor detecting force applied to depress a brake pedal (all not shown), a traveling situation, and the like.

Figure 2:
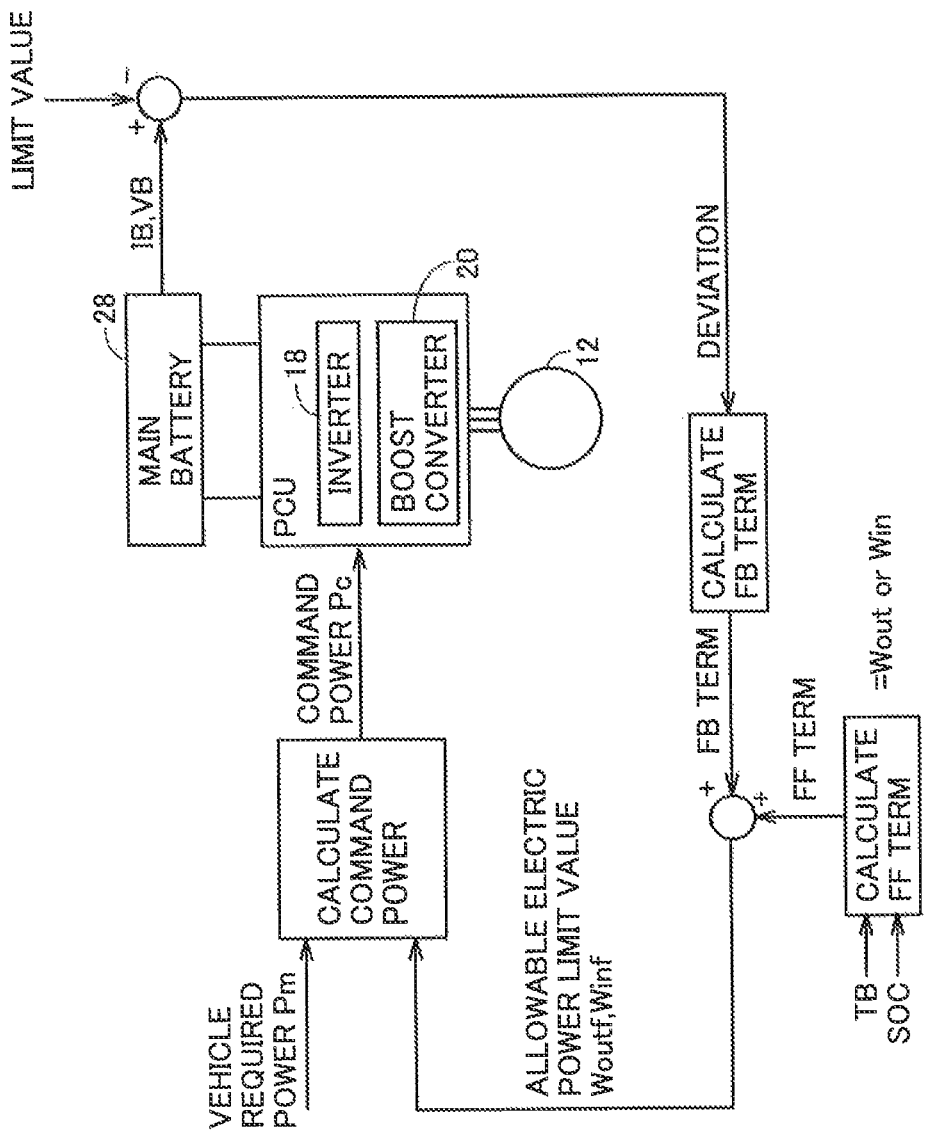
FIG. 2 is a block diagram showing a calculation flow of an allowable electric power limit value.

ECU 200 determines a command power Pc based on the calculated vehicle required power Pm and an allowable electric power limit value, as shown in FIG. 2. ECU 200 generates an inverter drive signal and a converter drive signal based on the determined command power Pc. ECU 200 sends the generated inverter and converter drive signals to PCU 16.

The allowable electric power limit value includes an upper limit value Woutf and a lower limit value Winf. Upper limit value Woutf and lower limit value Winf define an allowable range of electric power. ECU 200 determines command power Pc based on calculated vehicle required power Pm and within allowable range of electric power.

For instance, ECU 200 determines upper limit value Woutf as command power Pc when calculated vehicle required power Pm exceeds upper limit value Woutf. ECU 200 determines lower limit value Winf as command power Pc when calculated vehicle required power Pm is below lower limit value Winf. ECU 200 determines vehicle required power Pm as command power Pc when calculated vehicle required power Pm is within the allowable range of electric power which is between upper limit value Woutf and lower limit value Winf.

ECU 200 calculates upper limit value Woutf and lower limit value Winf from the sum of an FF term and an FR term, which will be described later. It is noted that ECU 200 may determine upper limit value Woutf and lower limit value Winf from the sum of the FF term, the FB term and, additionally, an electric power deviation between actual electric power and command electric power.

ECU 200 calculates the FF term based on temperature TB of main battery 28 or the remaining capacity of main battery 28 (hereinafter referred to as SOC).

Based on temperature TB of main battery 28 or the SOC, ECU 200 calculates input electric power which is allowable during the charging of main battery 28, as the FF term for determining lower limit value Winf. In the following description, input power allowable during the charging of main battery 28 will be referred to as a charge electric power limit value Win or simply as Win.

Further, based on temperature TB of main battery 28 or the SOC, ECU 200 calculates output electric power which is allowable during the discharging of main battery 28, as the FF term for determining upper limit value Woutf. In the following description, output power allowable during the discharging of main battery 28 will be referred to as a discharge electric power limit value Wout or simply as Wout. It is noted that it is assumed that discharge electric power limit value Wout is a positive value and charge electric power limit value Win is a negative value.

ECU 200 determines discharge electric power limit value Wout such that discharge electric power limit value Wout gradually lowers when the present SOC of main battery 28 decreases below a threshold SOC(0). In contrast, ECU 200 determines charge electric power limit value Win such that an absolute value of charge electric power limit value Win gradually lowers when the present SOC increases above a threshold SOC(1) (>SOC(0)).

A secondary battery used as main battery 28 has temperature dependence exhibiting a rise in internal resistance at lower temperatures. At higher temperatures, it is necessary to prevent an excessive rise in temperature caused by further heat generation.

For this reason, preferably, when battery temperature TB falls below threshold TB(0), ECU 200 causes the magnitudes of Wout and Win to fall below the magnitudes of Wout and Win when battery temperature TB is higher than TB(0).

In addition, preferably, when battery temperature TB rises above threshold value TB(1) (>TB(0)), ECU 200 causes the magnitudes of Wout and Win to fall below the magnitudes of Wout and Win when battery temperature TB is lower than TB(1).

ECU 200 may determine Win and Wout according to battery temperature TB and the present SOC, for example, by using a map or the like.

ECU 200 calculates the FB term based on current IB and voltage VB of main battery 28. ECU 200 calculates the FB term from the sum of a first FB term calculated based on a deviation between current IB and a current limit value and a second FB term calculated based on a deviation between voltage VB and a voltage limit value. The current limit value includes a current upper limit value IB(0) and a current lower limit value IB(1) serving as boundary values of a current limit range. The voltage limit value includes a voltage upper limit value VB(0) and a voltage lower limit value VB(1) serving as boundary values of a voltage limit range. The current limit value and the voltage limit value may be predetermined values or may be fluctuated for the purpose of, for example, protection of electrical equipment on an electric power transmission path between MG 12 and main battery 28. For instance, ECU 200 may cause the magnitude of the current limit value or the voltage limit value to fall below the initial value when a protection mode for protecting the electrical equipment is selected because of the fact that the temperature of the electrical equipment has become not less than a threshold value.

Figure 3:
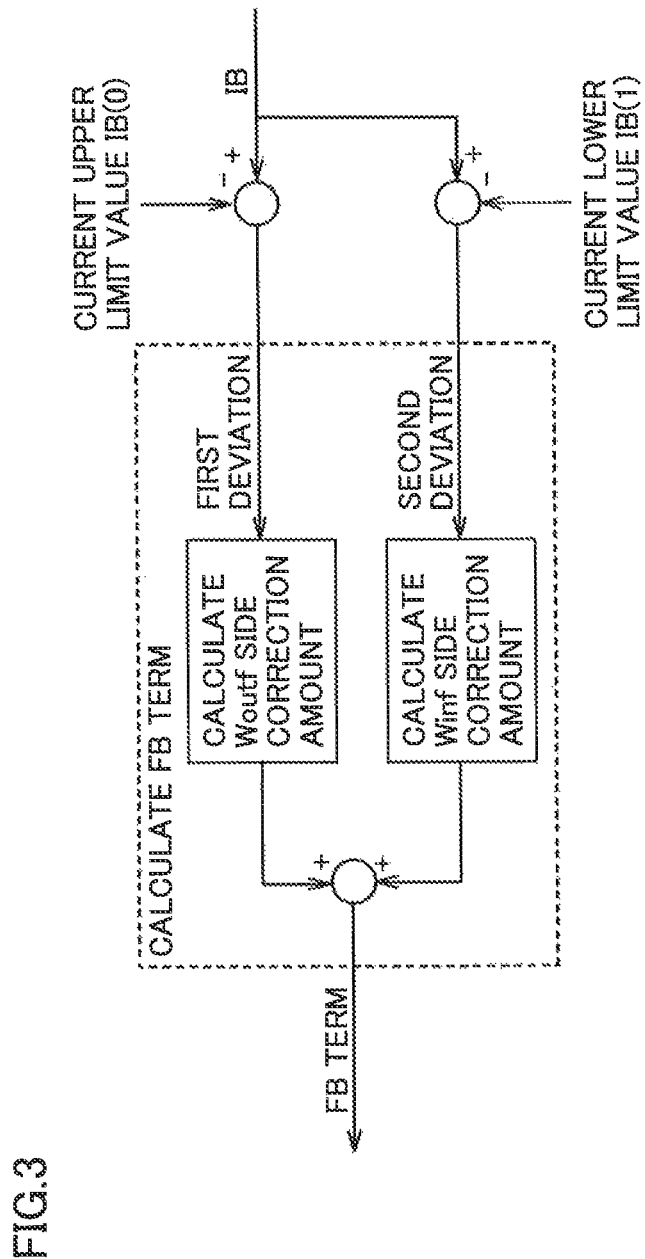
FIG. 3 is a block diagram showing a calculation flow of an FB term.

A method of calculating the first FB term based on current TB will be described below using FIG. 3. It is noted that the same applies to a method of calculating the second FB term based on voltage VB, and therefore, a detailed description thereof will not be repeated.

ECU 200 calculates the first FB term from the sum of a Woutf side correction amount and a Winf side correction amount. ECU 200 calculates the Woutf side correction amount based on a first deviation between current IB and current upper limit value IBM. It is noted that upper limit value Woutf is a value not more than Wout which serves as the FF term. For this reason, the Woutf side correction amount is a value not more than zero. ECU 200 sets the Woutf side correction amount to zero when the calculated Woutf side correction amount is a value greater than 0.

ECU 200 calculates the Winf side correction amount based on a second deviation between current IB and current lower limit value IB(1). It is noted that lower limit value Winf is a value not less than Win which serves as the FF term. For this reason, the Winf side correction amount is a value not less than zero. ECU 200 sets the Winf side correction amount to zero when the calculated Winf side correction amount is less than 0.

Figure 4:
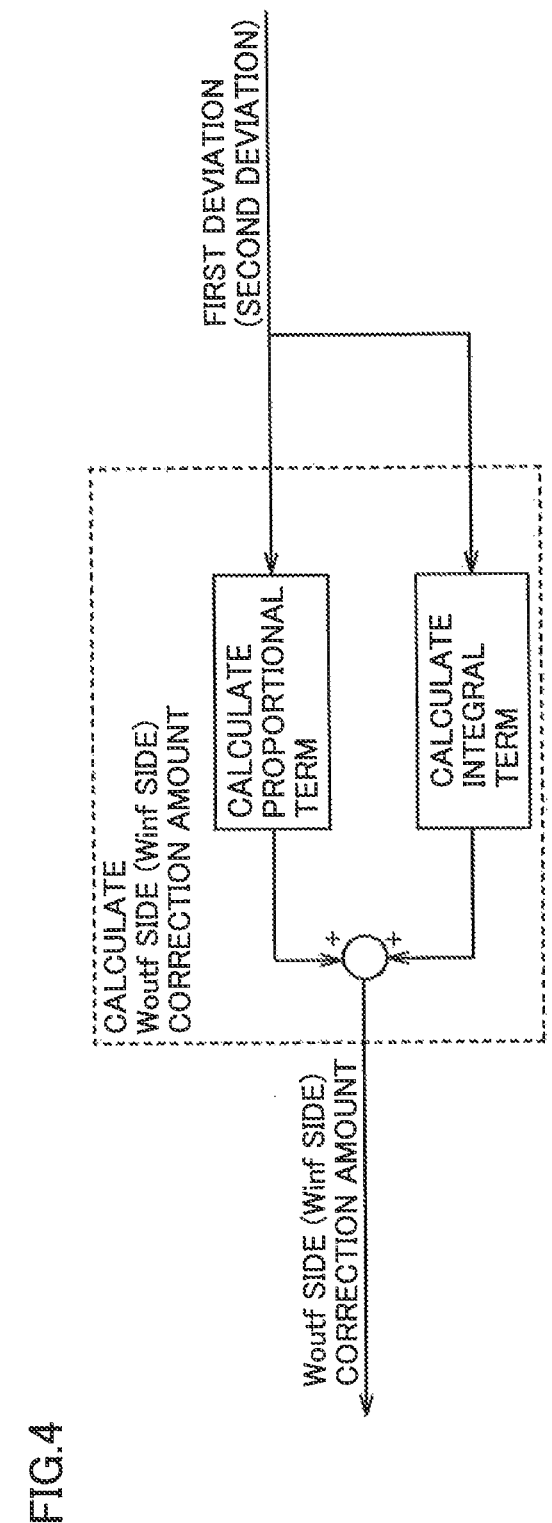
FIG. 4 is a block diagram showing a calculation flow of Woutf side correction amount and Winf side correction amount.

A method of calculating the Woutf side correction amount will be described below using FIG. 4. It is noted that the same applies to a method of calculating the Winf side correction amount, and therefore, a detailed description thereof will not be repeated.

ECU 200 calculates the Woutf side correction amount from the sum of a proportional term and an integral term. ECU 200 calculates a value of the first deviation multiplied by a proportional gain, as the proportional term. ECU 200 calculates a value of the time-integrated first deviation multiplied by an integration gain, as the integral term. It is noted that each of the proportional gain and the integral gain includes an electric power conversion factor for converting the unit of the calculated proportional term to the unit of electric power (kw).

In the present embodiment, the Woutf side correction amount has been described as being calculated from the proportional term and the integral term, however, it may be calculated from the proportional term, the integral term and, additionally, a differential term. ECU 200 calculates a value of the time-differentiated first deviation multiplied by a differential gain, as the differential term. It is noted that the differential term includes an electric power conversion factor for converting the unit of the calculated proportional term to the unit of electric power (kw). The Woutf side correction amount and the Winf side correction amount each have a positive or negative sign which is regulated when the first deviation is calculated or depending on various gains.

Therefore, when current IB is higher than current upper limit value IB(0), ECU 200 determines, as upper limit value Woutf, a value lower than Wout by the magnitude of Woutf side correction amount according to the difference between current IB and current upper limit value IB(0). The greater the magnitude of a deviation between current IB and current upper limit value IB(0) is, the greater the magnitude of the Woutf side correction amount is. The greater the magnitude of the Woutf side correction amount is, the greater the magnitude of the first FB term is.

Further, when current IB is lower than current lower limit value IB(1), ECU 200 determines, as lower limit value Winf, a value higher than Win by the magnitude of Winf side correction amount according to the difference between current 1B and current lower limit value IB(1). The greater the magnitude of a deviation between current IB and current lower limit value IB(1) is, the greater the magnitude of Winf side correction amount is. The greater the magnitude of the Winf side correction amount is, the greater the magnitude of the first FB term is.

Figure 5:
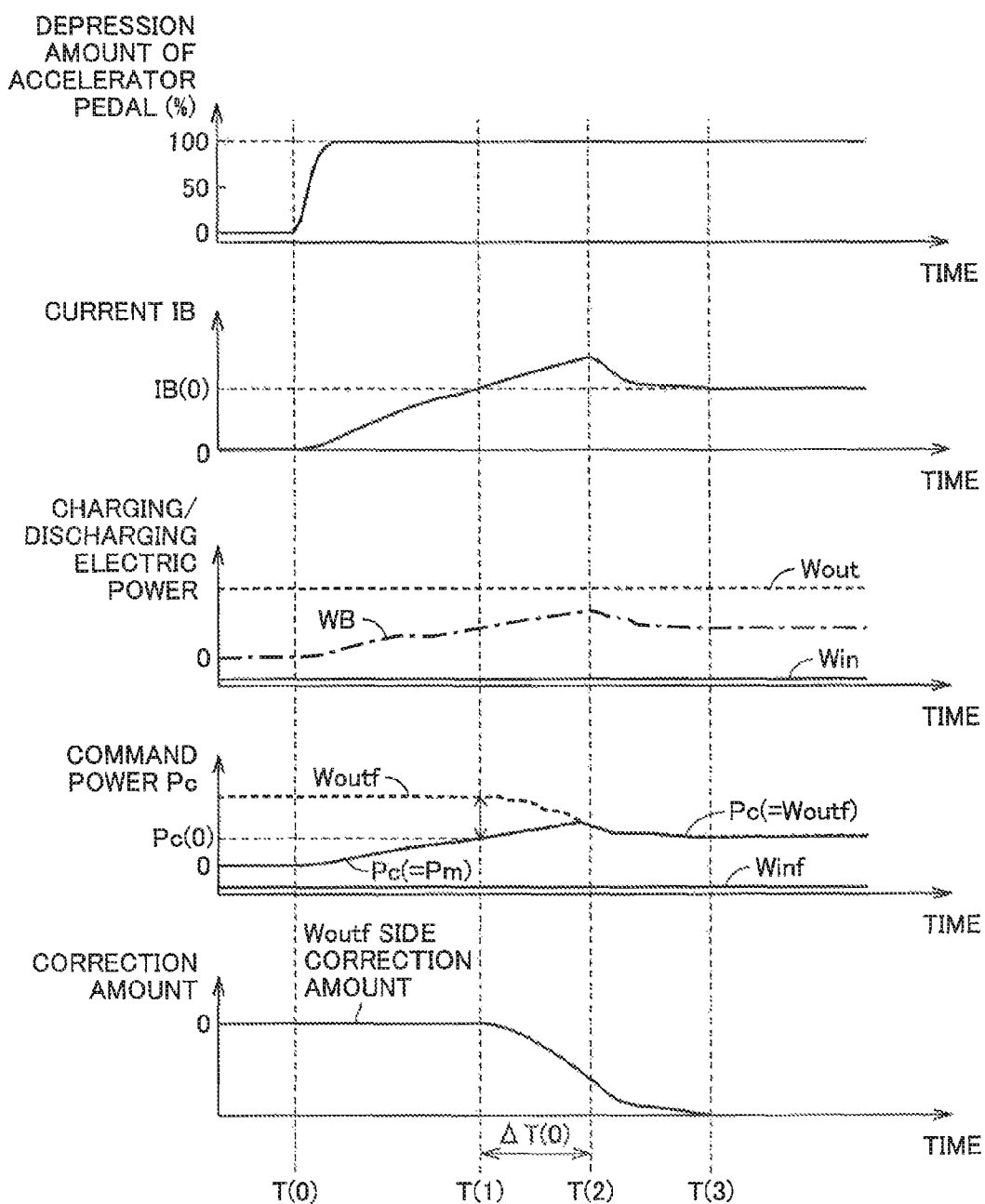
FIG. 5 is a diagram illustrating the operation in which current overshoots a current upper limit value.

A case is assumed where vehicle 10 having a configuration as above is in a stopped state. At this time, as shown in FIG. 5, a depression amount of an accelerator pedal, current 1B, charging/discharging electric power WB, vehicle required power Pm, and the first FB term are zero. It is noted that in the following description, it will be assumed that the second FB term is continuously zero.

At time T(0), when a driver starts depressing the accelerator pedal, the depression amount of the accelerator pedal increases. Subsequently, the depression amount of the accelerator pedal enters a state in which it is 100%.

Vehicle required power Pm increases according to the increase in depression amount of the accelerator pedal. Increased vehicle required power Pm causes electric power of main battery 28 to be supplied to MG 12. The supply of electric power to MG 12 causes MG 12 to start driving. Driven by MG 12, vehicle 10 starts traveling. When the electric power supply to MG 12 is started, current IB increases and charging/discharging power WB begins to increase toward the discharge side.

At time T(1), when current IB becomes not less than current upper limit value IB(0), the magnitude of the Woutf side correction amount begins to increase. For this reason, upper limit value Woutf begins to decrease from time T(1).

At time T(1), vehicle required power Pm has a value less than upper limit value Woutf. For this reason, when the driver keeps the accelerator pedal depressed, calculated vehicle required power Pm is determined as command power Pc. That is, even after current IB goes beyond current upper limit value IB(0), command power Pc continues to increase until vehicle required power Pm agrees with upper limit value Woutf. For this reason, the increase in current IB continues.

At time T(2), when vehicle required power Pm and upper limit value Woutf agree with each other, upper limit value Woutf is determined as command power Pc.

For this reason, even when vehicle required power Pm is greater than upper limit value Woutf, command power Pc is restricted to upper limit value Woutf. For this reason, the increase in command power Pc is suppressed, and therefore, the increase in current IB is suppressed. Subsequently, current 1B decreases and converges to current upper limit value IB(0).

At time T(3), a deviation between current 1B and current upper limit value IB(0) becomes substantially zero, and therefore, the first FB term is maintained at a constant value.

In this way, a delay of ΔT(0) occurs between time T(1) at which current IB becomes not less than current upper limit value IB(0) and time T(2) at which command power Pc is restricted. For this reason, in some cases, current IB overshoots current upper limit value IB(0).

In the same way, a delay occurs also when current IB becomes not more than current lower limit value IB(1), between when current IB becomes not more than current lower limit value IB(1) and when command power Pc is restricted. In this case, current IB may undershoot current lower limit value IB(1).

Here, the present embodiment is characterized in that ECU 200 brings a boundary value which corresponds to vehicle required power Pm and is one of upper limit value Woutf and lower limit value Winf of an allowable range of electric power into agreement with vehicle required power Pm when there is a divergence between the corresponding boundary value and the vehicle required power at a first point in time when current IB agrees with a limit value.

Figure 6:
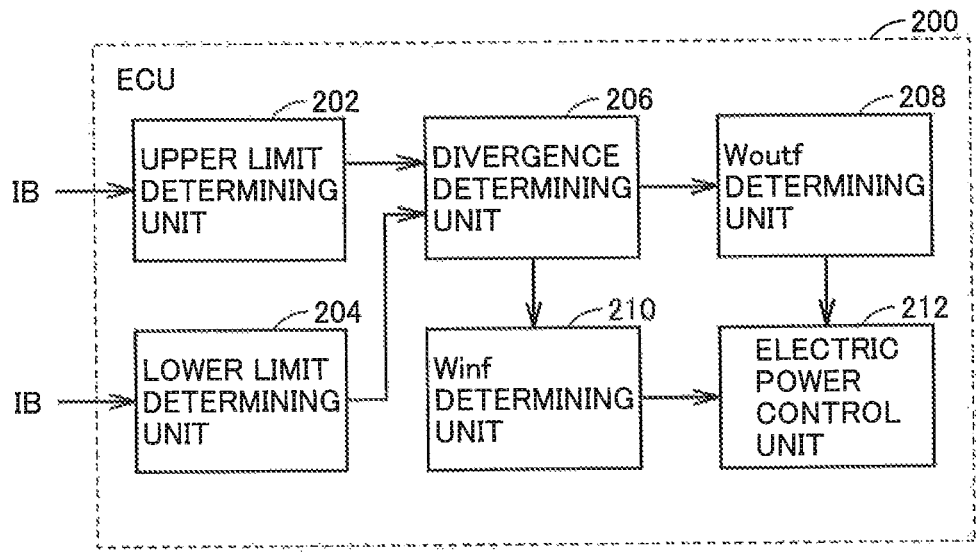
FIG. 6 is a functional block diagram of an ECU mounted on the vehicle according to the first embodiment.

FIG. 6 shows a functional block diagram of ECU 200 mounted on vehicle 10 according to the present embodiment. ECU 200 includes an upper limit determining unit 202, a lower limit determining unit 204, a divergence determining unit 206, a Woutf determining unit 208, a Winf determining unit 210, and an electric power control unit 212. It is noted that in the following description, it will be assumed that the second FB term is zero.

Upper limit determining unit 202 determines whether or not current IB is equal to or more than current upper limit value IB(0). It is noted that upper limit determining unit 202 may, for example, turn on a current upper limit determination flag when current IB is equal to or more than current upper limit value IB(0).

Lower limit determining unit 204 determines whether or not current IB is equal to or less than current lower limit value IB(1). It is noted that lower limit determining unit 204 may, for example, turn on a current lower limit determination flag when current IB is equal to or less than current lower limit value IB(1).

Each of current upper limit value IB(0) and current lower limit value IBM is a value for protecting electrical equipment on the electric power transmission path between main battery 28 and MG 12, and may be a predetermined value or may be a value determined depending on the temperature of the electrical equipment.

Divergence determining unit 206 determines whether or not there is a divergence between command power Pc and upper limit value Woutf at the time of agreement of current IB with the current limit value. In addition, divergence determining unit 206 determines whether or not there is a divergence between command power Pc and lower limit value Winf at the time of agreement of current IB with the current limit value. It is noted that command power Pc agrees with vehicle required power Pm when there is a divergence between command power Pc and upper limit value Woutf or lower limit value Winf at the time of agreement of current IB with the current limit value.

Divergence determining unit 206 determines whether or not there is a divergence between command power Pc and upper limit value Woutf when command power Pc at the time of agreement of current IB with the current limit value is a positive value greater than zero (during the discharging of main battery 28).

Divergence determining unit 206 determines that there is a divergence between command power Pc and upper limit value Woutf when, for example, the difference between command power Pc and upper limit value Woutf, i.e. Woutf−Pc is greater than a threshold value. It is noted that the threshold value may be a predetermined value or may be a value determined according to the state of main battery 28.

It is noted that determining that there is a divergence between command power Pc and upper limit value Woutf, divergence determining unit 206 may turn on an upper limit divergence determination flag.

Divergence determining unit 206 determines whether or not there is a divergence between command power Pc and lower limit value Winf when command power Pc at the time of agreement of current IB with the current limit value is a negative value less than zero (during the charging of main battery 28). Divergence determining unit 206 may determine that there is a divergence between command power Pc and lower Umit value Winf when, for example, the difference between command power Pc and lower limit value Winf, i.e. Pc−Winf is greater than a threshold value. It is noted that the threshold value may be a predetermined value or may be a value determined according to the state of main battery 28.

It is noted that determining that there is a divergence between command power Pc and lower limit value Winf, divergence determining unit 206 may turn on a lower limit divergence determination flag.

Woutf determining unit 208 determines upper limit value Woutf according to the sum of the FF term and the FB term in the manner as described above when a first execution condition is satisfied. In the present embodiment, the first execution condition includes a condition that current IB and current upper limit value IB(0) agree with each other and that there is a divergence between command power Pc and upper limit value Woutf at the time of the agreement. When the first execution condition is satisfied, Woutf determining unit 208 brings upper limit value Woutf into agreement with command power Pc at the time of agreement between current IB and current upper limit value IB(0).

Specifically, when the first execution condition is satisfied, Woutf determining unit 208 calculates the integral term such that the FB term has a magnitude greater by the magnitude value of Wout−Pc. In the following description, the processing in which the integral term is calculated such that the FB term has a magnitude greater by the magnitude value of Woutf−Pc will be referred to as Woutf addition processing.

In the present embodiment, in executing the Woutf addition processing, Woutf determining unit 208 calculates the integral term of the first FB term such that the first FB term has a magnitude greater by the magnitude value of Wout−Pc. It is noted that in executing the Woutf addition processing, Woutf determining unit 208 may calculate the proportional term of the first FB term such that the first FB term has a magnitude greater by the magnitude value of Wout−Pc. Alternatively, Woutf determining unit 208 may calculate the first FB term by making an addition to the sum of the integral term and the proportional term by the magnitude of Wout−Pc.

It is noted that, for example, when the current upper limit determination flag and the upper limit divergence determination flag are both in an ON state, Woutf determining unit 208 may determine command power Pc at a point in time when both of the flags have entered the ON state, as upper limit value Woutf.

Winf determining unit 210 determines lower limit value Winf according to the sum of the FF term and the FB term in the manner as described above when a second execution condition is satisfied. In the present embodiment, the second execution condition includes a condition that current IB and current lower limit value IB(1) agree with each other and that there is a divergence between command power Pc and lower limit value Winf at the time of the agreement. When the second execution condition is satisfied, Winf determining unit 210 brings lower limit value Winf into agreement with command power Pc at the time of agreement between current TB and current lower limit value IB(1).

Specifically, when the second execution condition is satisfied, Winf determining unit 210 calculates the integral term such that the FB terms has a magnitude greater by the magnitude value of Pc−Win. In the following description, the processing in which the integral term is calculated such that the FB term has a magnitude greater by the magnitude value of Pc−Win will be referred to as Winf addition processing.

In the present embodiment, in executing the Winf addition processing, Winf determining unit 210 calculates the integral term of the first FB term such that the first FB term has a magnitude greater by the magnitude of Pc−Win. It is noted that in executing the Winf addition processing. Winf determining unit 210 may calculate the proportional term of the first FB term such that the first FB term has a magnitude greater by the magnitude of Pc−Win. Alternatively, Winf determining unit 210 may calculate the first FB term by making an addition to the sum of the integral term and the proportional term by the magnitude of Pc−Win.

It is noted that, for example, when the current lower limit determination flag and the lower limit divergence determination flag are both in an ON state, Winf determining unit 210 may determine command power Pc at a point in time when both of the flags have entered the ON state, as lower limit value Winf.

Electric power control unit 212 controls MG 12 in accordance with command power Pc. Electric power control unit 212 generates the inverter drive signal and the boost converter drive signal and sends the generated drive signals to PCU 16.

In the present embodiment, although upper limit determining unit 202, lower limit determining unit 204, divergence determining unit 206, Woutf determining unit 208, Winf determining unit 210, and electric power control unit 212 are all described as functioning as software which is implemented through execution of a program stored in a memory by the CPU of ECU 200, they may be implemented by hardware. It is noted that such a program is recorded in a storage medium for installation in the vehicle.

Figure 7:
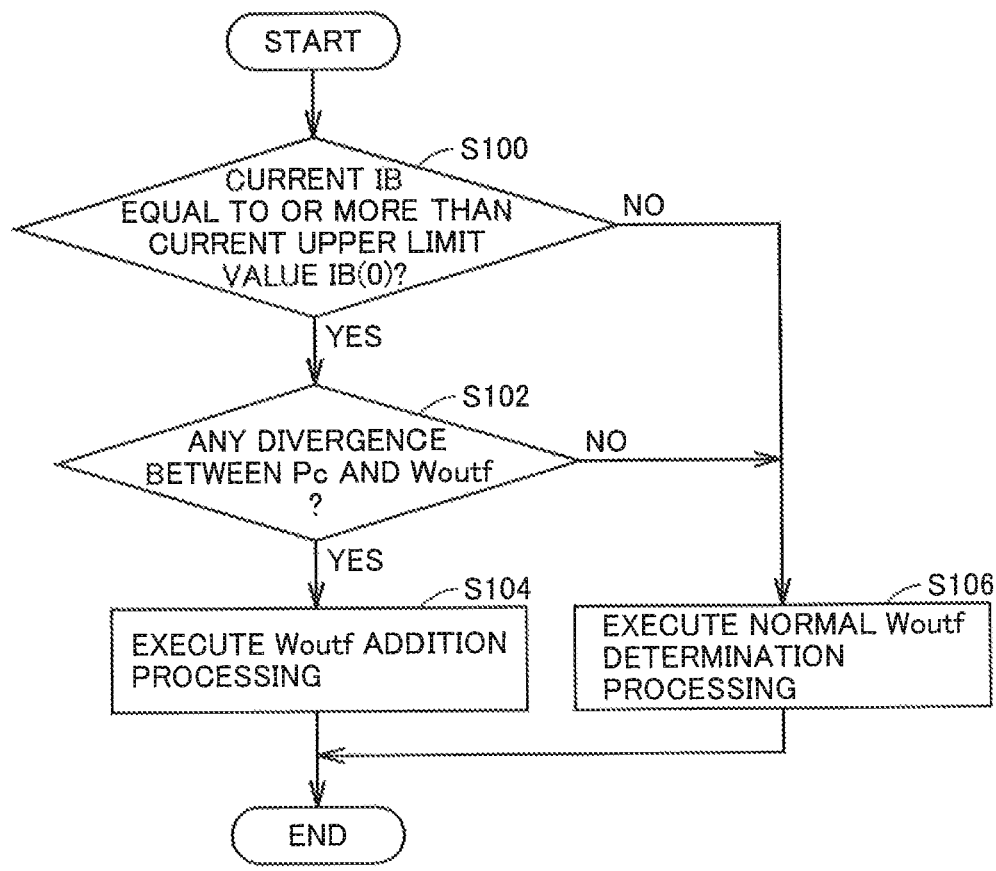
FIG. 7 is a flowchart (No. 1) showing a control structure of a program executed in the ECU mounted on the vehicle according to the first embodiment.

Referring to FIG. 7, a description will be given of a control structure of a program which is executed in ECU 200 mounted on vehicle 10 according to the present embodiment and determines upper limit value Woutf. ECU 200 executes a program based on a flowchart shown in FIG. 7 for each predetermined calculation cycle.

In step (step is hereinafter referred to as S) 100, ECU 200 determines whether or not current 1B is equal to or more than current upper limit value IB(0). If current IB is equal to or more than current upper limit value IB(0) (YES in S100), the process shifts to S102. If not (NO in S100), the process shifts to S106.

In S102, ECU 200 determines whether or not there is a divergence between command power Pc and upper limit value Woutf at the time of agreement between current IB and current upper limit value IB(0). It is noted that how to determine whether or not there is a divergence is as described above, and therefore, a detailed description thereof will not be repeated. If there is a divergence between command power Pc and upper limit value Woutf (YES in S102), the process shifts to S104. If not (NO in S102), the process shifts to S106.

In S104, ECU 200 executes the Woutf addition processing to determine upper limit value Woutf. It is noted that the Woutf addition processing is as described above, and therefore, a detailed description thereof will not be repeated. In S106, ECU 200 executes normal Woutf determination processing to determine upper limit value Woutf. That is, ECU 200 determines upper limit value Woutf from the sum of the FF term and the FB term.

Figure 8:
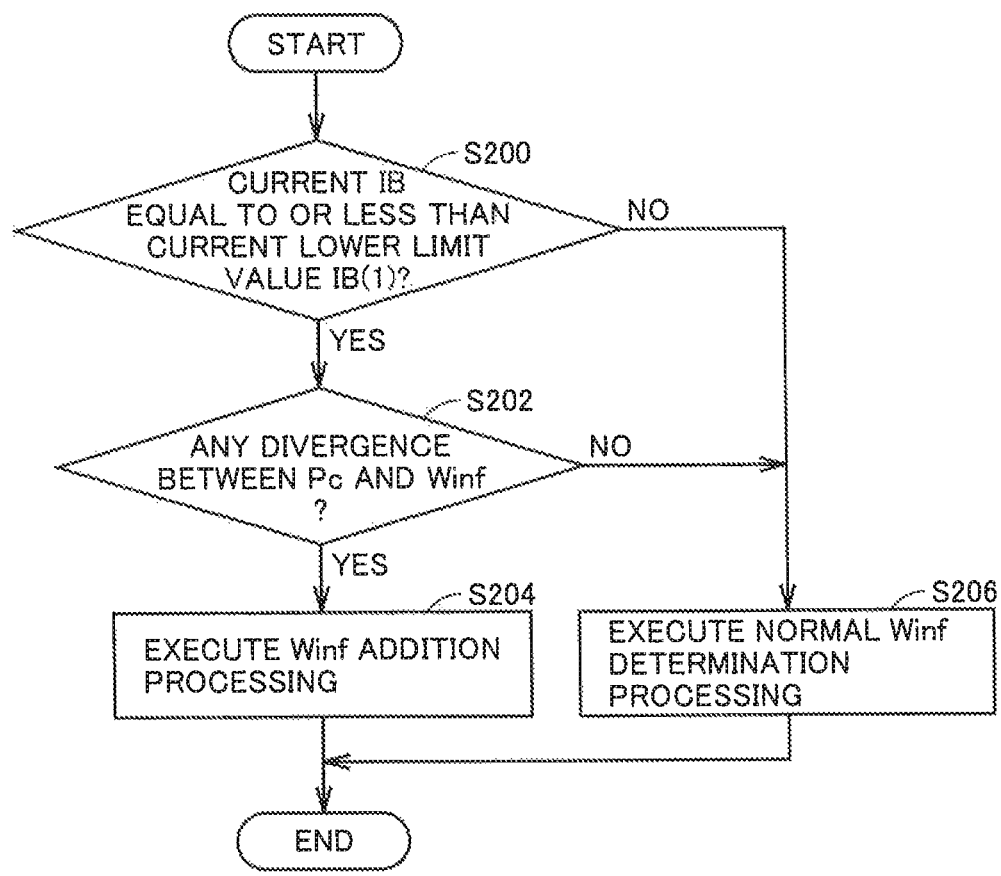
FIG. 8 is a flowchart (No. 2) showing a control structure of a program executed in the ECU mounted on the vehicle according to the first embodiment.

Next, referring to FIG. 8, a description will be given of a control structure of a program which is executed in ECU 200 mounted on vehicle 10 according to the present embodiment and determines lower limit value Winf. ECU 200 executes a program based on a flowchart shown in FIG. 8 for each predetermined calculation cycle.

In S200, ECU 200 determines whether or not current IB is equal to or less than current lower limit value IB(1). If current IB is equal to or less than current lower limit value IB(1) (YES in S200), the process shifts to S202. If not (NO in S200), the process shifts to S206.

In S202, ECU 200 determines whether or not there is a divergence between command power Pc and lower limit value Winf at the time of agreement between current IB and current lower limit value IB(1). It is noted that how to determine Whether or not there is a divergence is as described above, and therefore, a detailed description thereof will not be repeated. If there is a divergence between command power Pc and lower limit value Winf (YES in S202), the process shifts to S204. If not (NO in S202), the process shifts to S206.

In S204, ECU 200 executes the Winf addition processing to determine lower limit value Winf. It is noted that the Winf addition processing is as described above, and therefore, a detailed description thereof will not be repeated. In S206, ECU 200 executes normal Winf determination processing to determine lower limit value Winf. That is, ECU 200 determines lower limit value Winf from the sum of the FF term and the FB term.

Figure 9:
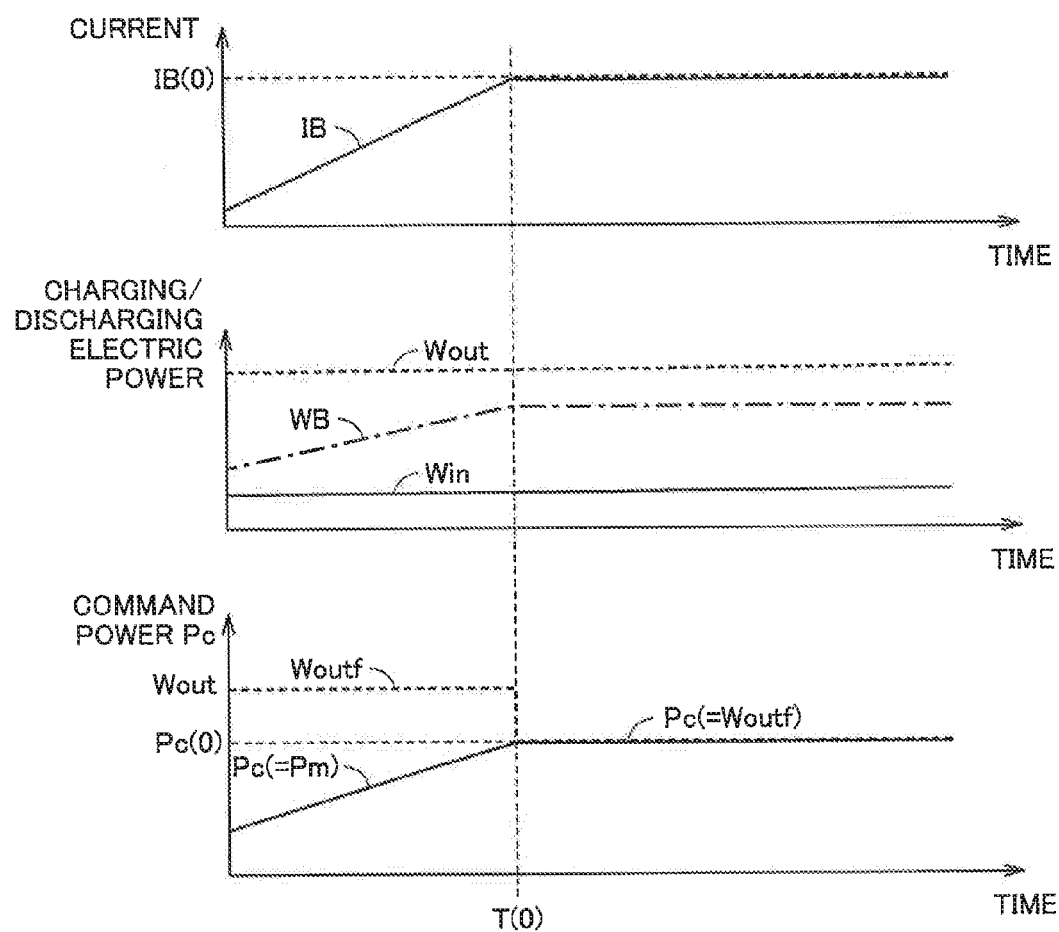
FIG. 9 is a timing chart (No. 1) showing the operation of the ECU mounted on the vehicle according to the first embodiment.
Figure 10:
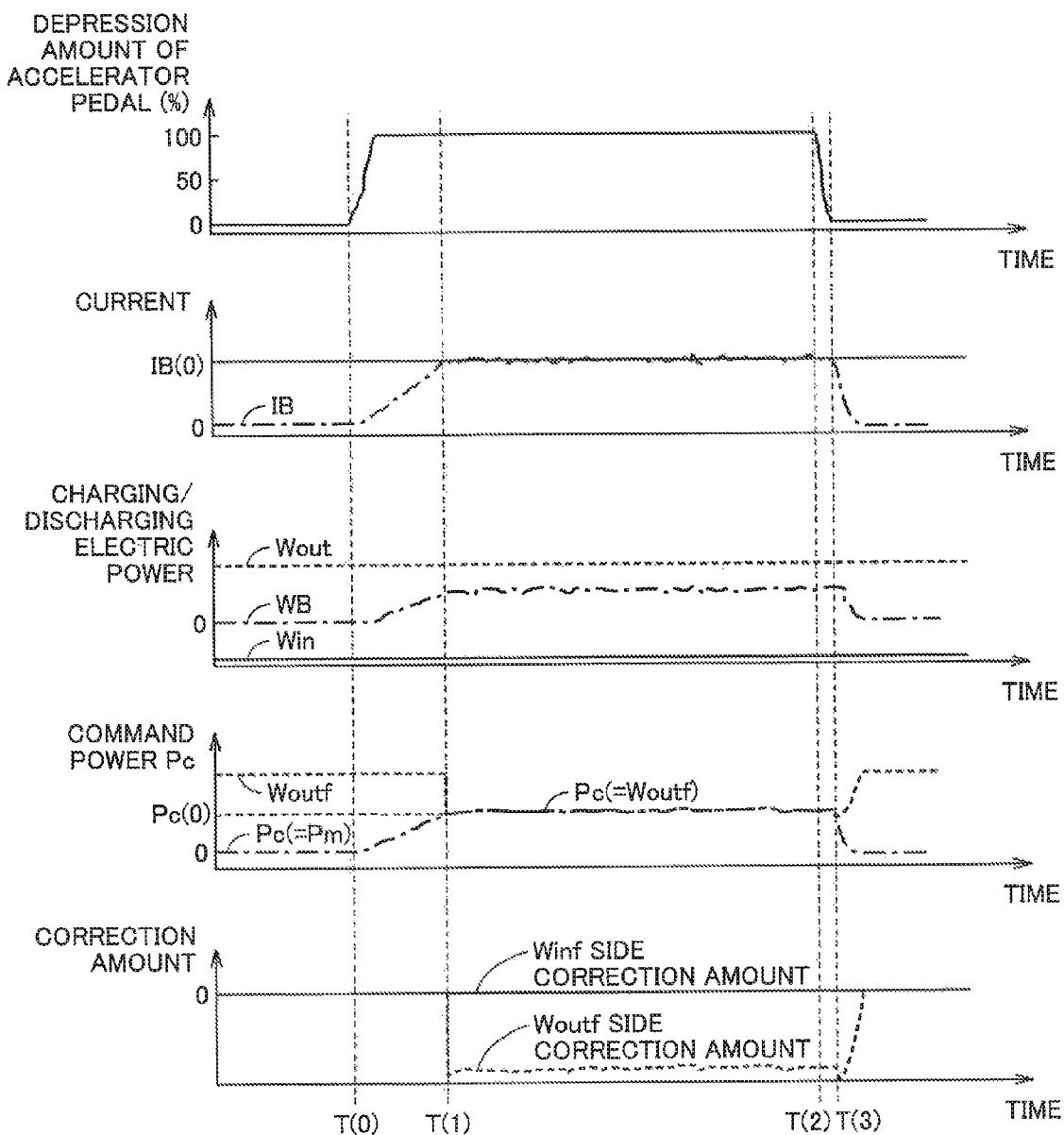
FIG. 10 is a timing chart (No. 2) showing the operation of the ECU mounted on the vehicle according to the first embodiment.
Figure 11:
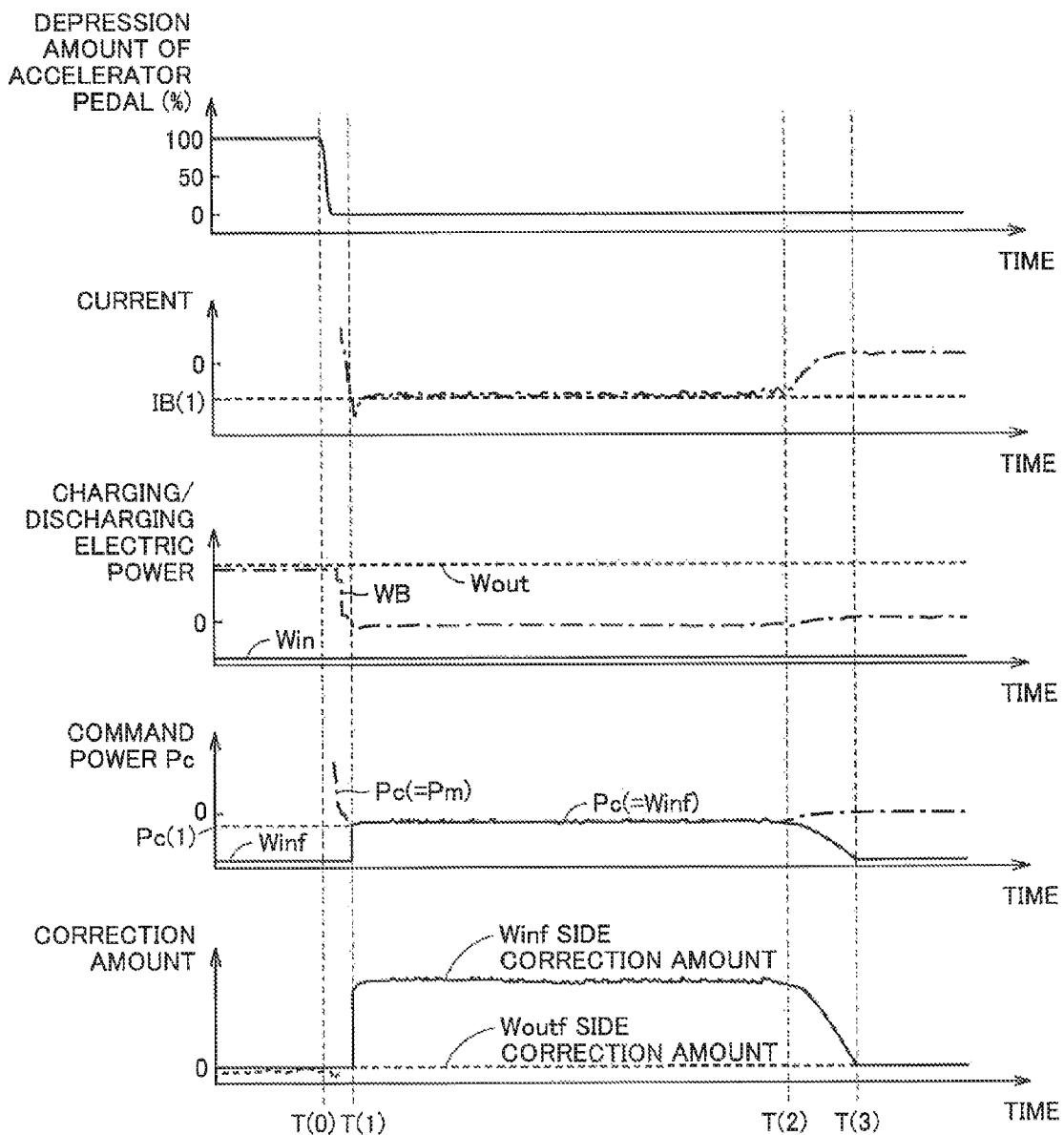
FIG. 11 is a timing chart (No. 3) showing the operation of the ECU mounted on the vehicle according to the first embodiment.

Referring to FIGS. 9 to 11, a description will be given of the operation of ECU 200 mounted on vehicle 10 according to the present embodiment based on the structure and flowcharts as above. It is noted that it is assumed that the second FB term based on voltage VB is zero.

Case where Current IB is Equal to or More than Current Upper Limit Value IB(0) (No. 1)

For instance, a case is assumed where the depression amount of the accelerator pedal is increased by a driver to 100% when vehicle 10 is in a stopped state. The increase in depression amount of the accelerator pedal causes, as shown in FIG. 9, current IB, charging/discharging power WB, and command power Pc to increase as time passes.

At time T(0), when current IB agrees with current upper limit value IB(0) and thus is equal to or more than current upper limit value IB(0) (YES in S100), since there is a divergence between command power Pc(0) and upper limit value Woutf at the time of the agreement (YES in S102), the Woutf addition processing is executed (S104).

At this time, an addition by the magnitude of Wout−Pc(0) is made to the integral term of the first FB term. It is noted that the values of the proportional term and the integral term based on the first deviation of current IB are zero when current IB and current upper limit value IB(0) agree with each other. Therefore, the Woutf side correction amount is Pc(0) Wout. When the Winf side correction amount is zero, the first FE term is Pc(0)−Wout. For this reason, upper limit value Woutf is Pc(0) according to the sum of the FF term (Wout) and the first FB term.

For this reason, at and after time T(0), ECU 200 determines upper limit value Woutf, i.e. Pe(0) as command power Pc even when vehicle required power Pm is greater than Pc(0).

As a result, the increase in command power Pc is suppressed, and therefore, the increase in current IB is suppressed. Also, when a state in which current IB agrees with current upper limit value IB(0) continues (YES in S100), command power Pc and upper limit value Woutf do not diverge from each other (NO in S102). For this reason, upper limit value Woutf is determined through the normal Woutf determination processing (S106). At this time, since the first deviation is zero, the value of the first FB term in the previous calculation cycle is maintained. This results in that upper limit value Woutf is a value identical with Pc(0).

Case where Current IB is Equal to or More than Current Upper Limit Value IE(0) (No. 2)

For instance, a case is assumed where vehicle 10 is in a stopped state. At this time, when the depression amount of the accelerator pedal is 0%, no electric power is supplied to MG 12. For this reason, as shown in FIG. 10, current IB, charging/discharging power WE, command power Pc, and the first FE term are substantially zero. As a result, upper limit value Woutf is a value identical with Wout.

At time T(0), when a driver starts depressing the accelerator pedal, electric power is supplied to MG 12, and vehicle 10 starts traveling. Subsequently, the driver increases the depression amount of the accelerator pedal until the depression amount of the accelerator pedal reaches 100%. For this reason, current 1B begins to increase toward current upper limit value IB(0).

At time T(1), when current 1B agrees with current upper limit value IB(0) and thus is equal to or more than current upper limit value IB(0) (YES in S100), since there is a divergence between command power Pc(0) and upper limit value Woutf at the time of the agreement (YES in S102), the Woutf addition processing is executed (S104). For this reason, at time T(1), upper limit value Woutf is brought into agreement with Pc(0).

At and after time T(1), ECU 200 determines upper limit value Woutf, i.e. Pc(0) as command power Pc even when vehicle required power Pm is greater than Pc(0).

As a result, an increase in command power Pc is suppressed, and therefore, the increase in current IB is suppressed. Also, when a state in which current IB agrees with current upper limit value IB(0) continues (YES in S100), command power Pc and upper limit value Woutf do not diverge from each other (NO in S102). For this reason, upper limit value Woutf is determined through the normal Woutf determination processing (S106). At this time, since the first deviation is zero, the value of the first FB term in the previous calculation cycle is maintained. This result in that upper limit value Woutf is a value identical with Pc(0).

At time T(2), the driver decreases the depression amount of the accelerator pedal to zero, causing current 1B to fall below current upper limit value IB(0) at time T(3) (NO in S100). Also, vehicle required power Pm becomes less than upper limit value Woutf (=Pc(0)), causing command power Pc to fall below upper limit value Woutf. For this reason, upper limit value Woutf is determined through the normal Woutf determination processing (S106).

At this time, a change in current IB causes a change in the first deviation, and the magnitude of the first FB term begins to decrease. For this reason, upper limit value Woutf is increasing until it reaches a value identical with Wout. Upper limit value Woutf is a value identical with Wout.

Case where Current IB is Equal to or Less than Current Lower Limit Value IB(1)

As shown in FIG. 11, a case is assumed where a state in which the depression amount of the accelerator pedal is 100% is maintained. At this time, main battery 28 is in a discharging state supplying electric power to MG 12.

At time T(0), when a driver releases the accelerator pedal from depression, causing the depression amount of the accelerator pedal to be 0%, regenerative breaking using MG 12 is performed. For this reason, current IB has its positive or negative sign turned into negative sign, and current IB increases in the negative direction at and after time T(0).

At time T(1), when current 1B agrees with current lower limit value IB(1) and thus is equal to or less than current lower limit value IB(1) (YES in S200), there is a divergence between command power Pc(1) and lower limit value Winf at the time of the agreement (YES in S202). For this reason, the Winf addition processing is executed (S204).

At this time, an addition by the absolute value of Pc(1)–Win is made to the integral term of the first FB term. It is noted that the values of the proportional term and the integral term based on the first deviation of current IB are zero when current IB and current lower limit value IB(1) agree with each other. Therefore, the Winf side correction amount is Pc(1)–Win. When the Woutf side correction amount is zero, the first FB term is Pc(1)–Win. Therefore, lower limit value Winf is Pc(1) according to the sum of the FF term (Win) and the first FB term.

For this reason, at and after time T(1). ECU 200 determines lower limit value Winf, i.e. Pc(1) as command power Pc even when vehicle required power Pm is less than Pc(1).

As a result, a decrease in command power Pc is suppressed, and therefore, a decrease in current IB is suppressed. Also, when a state in which current IB agrees with current lower limit value IB(1) continues (YES in S200), command power Pc and lower limit value Winf do not diverge from each other (NO in S202). For this reason, lower limit value Winf is determined through the normal Winf determination processing (S206). At this time, since the first deviation is zero, the value of the first FB term in the previous calculation cycle is maintained. This results in that lower limit value Winf is a value identical with Pc(1).

At time T(2), when the speed of vehicle 10 decreases, causing the regenerative breaking to end, current IB rises above current lower limit value IB(1) (NO in S200). Also, vehicle required power Pm becomes greater than lower limit value Winf(=Pc(1)), causing command power Pc to rise above lower limit value Winf. For this reason, lower limit value Winf is determined through the normal Winf determination processing (S206).

At this time, a change in current IB causes a change in the first deviation, and the magnitude of the first FB term begins to decrease. For this reason, lower limit value Winf is increasing until it reaches a value identical with Win. At time T(3), lower limit value Winf is a value identical with Win.

In the above-described manner, with the vehicle according to the present embodiment, the Woutf addition processing is executed at the time of agreement between current IB and current upper limit value IB(0), so that an increase in command power Pc is suppressed at and after the time of agreement between current IB and current upper limit value IB(0). For this reason, an overshoot of current IB relative to current upper limit value IB(0) is suppressed. Further, the Winf addition processing is executed at the time of agreement between current IB and current lower limit value IB(1), so that an increase in command power Pc is suppressed at and after the time of agreement between current IB and current lower limit value IB(1). For this reason, an undershoot of current IB relative to current lower limit value IB(1) is suppressed. Therefore, a vehicle and a control method for a vehicle which change an input/output limit value more rapidly so that a voltage and/or current does not go beyond an allowable range can be provided.

It is noted that although PCU 16 is described as including inverter 18 and boost converter 20 in the present embodiment, PCU 16 may have a configuration not including boost converter 20 for the sake of simplicity.

Vehicle 10 is described as, but not particularly limited to, an electric vehicle in the present embodiment and may be a hybrid vehicle further equipped with an engine.

First Modification of First Embodiment

A vehicle according to a first modification of the first embodiment will be described below. As compared with the configuration of the vehicle according to the above-described first embodiment, the vehicle according to the present modification differs in the operation of ECU 200. Except that point, the vehicle has the same configuration as the configuration of the vehicle according to the above-described first embodiment. They have the same reference characters allotted. They also have the same functions. Therefore, a detailed description thereof will not be repeated here.

In the above-described first embodiment, current IB, which is used to determine whether or not the first execution condition for executing the Woutf addition processing or the second execution condition for executing the Winf addition processing is satisfied and to calculate the first FB term for determining upper limit value Woutf or lower limit value Winf, has been described on the premise that it has the same value, but current 1B is not particularly limited to this premise.

In some cases, an actual value measured by current sensor 158 may fluctuate greatly due to noise and the like. For this reason, ECU 200 may alter a weight coefficient which reflects an actually measured value of current IB detected by current sensor 158 in the previous value, to compute the present value.

For instance, ECU 200 calculates a computed value IB(n) of current IB in the present calculation cycle using an expression, IB(n)=IB(n−1)+α(RIB(n)−IB(n−1)), where IB(n−1) is a computed value of current IB in the previous calculation cycle, RIB(n) is an actual value measured by current sensor 158 in the present calculation cycle, α is a weight coefficient greater than zero and not more than one, and n is a natural number. It is noted that the expression for calculating computed value IB(n) of current IB in the present calculation cycle is not particularly limited to the above-described expression and may be any expression that is at least capable of reducing components of noise and the like in the actual value measured by current sensor 158 to calculate computed value IB(n) of current IB in the present calculation cycle.

Figure 12:
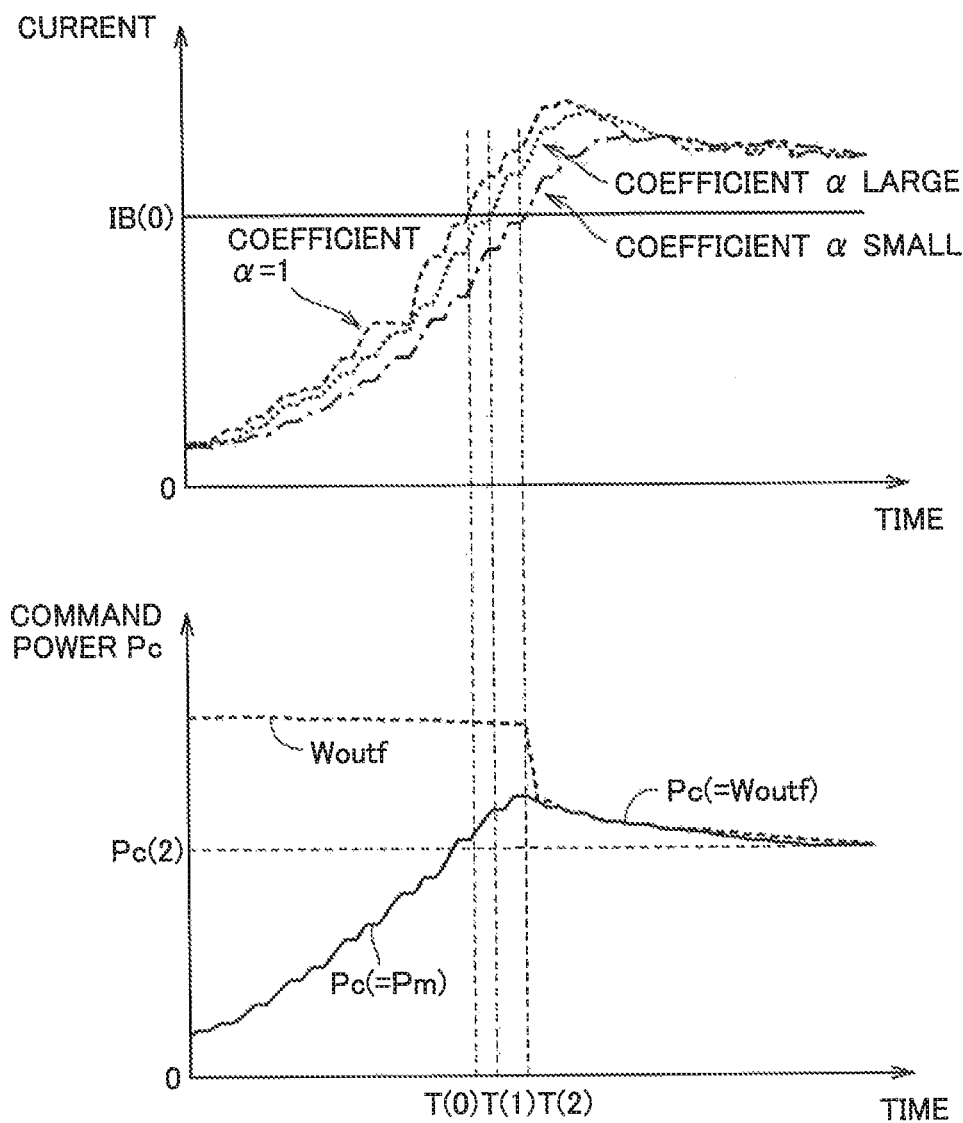
FIG. 12 is a timing chart showing changes in current and command power.

As indicated by alternate long and short dashed lines in FIG. 12, the less value weight coefficient α has, the further suppression of fluctuations in current IB is achieved. For this reason, fluctuations in the first FB term are suppressed. As a result, fluctuations in Woutf or Winf are suppressed.

However, computed value IB(n) changes with a delay relative to a change in actual measured value RIB(n). For this reason, when computed value IB(n) is used to determine whether or not the first execution condition for executing the above-described Woutf addition processing is satisfied, the Woutf addition processing is executed with delayed timing (the timing at which the alternate long and short dashed lines and a solid line indicating IB(0) intersect in FIG. 12) as compared with the timing at which actual measured value RIB(n) goes beyond current upper limit value IB(0) (the timing at which a bold broken line and the solid line indicating IB(0) intersect in FIG. 12). This results in that, in some cases, command power Pc overshoots a convergence value Pc(2) by a larger amount.

In contrast, as indicated by a thin broken line in FIG. 12, the larger value weight coefficient α has, the further improvement is achieved in a delay in change in computed value IB(n) of current IB relative to actual measured value RIB(n). For this reason, as compared with a case where the weight coefficient is small, the timing of execution of the Woutf addition processing (the timing at which the alternate long and short dashed lines and the solid line indicating IB(0) intersect in FIG. 12) can be moved close to the timing at which actual measured value RIB(n) goes beyond current upper limit value IB(0) (the timing at which the thin broken line and the solid line indicating IB(0) intersect in FIG. 12). For this reason, the amount by which command power Pc overshoots convergence value Pc(2) can be reduced.

In contrast, computed value IB(n) fluctuates more greatly, and therefore, fluctuations in the first PB term increase. As a result, fluctuations in Woutf or Winf increase.

Here, the present modification is characterized in that weight coefficient α for calculating computed value IB(n) of current IB in the present calculation cycle differs between when determining whether or not the above-described first execution condition or second execution condition is satisfied and when calculating the first FB term.

Specifically, ECU 200 determines whether or not the above-described first execution condition or second execution condition is satisfied using a weight coefficient α(1) and calculates the first FB term using a weight coefficient α(2). Here, weight coefficient α(1) is a value greater than weight coefficient α(2), for example.

It is noted that the present modification is the same as vehicle 10 described in the first embodiment above as to the configuration and operation thereof, except that weight coefficient α differs between when determining whether or not the above-described first execution condition or second execution condition is satisfied and when calculating the first FB term. For this reason, a detailed description thereof will not be repeated.

Figure 13:
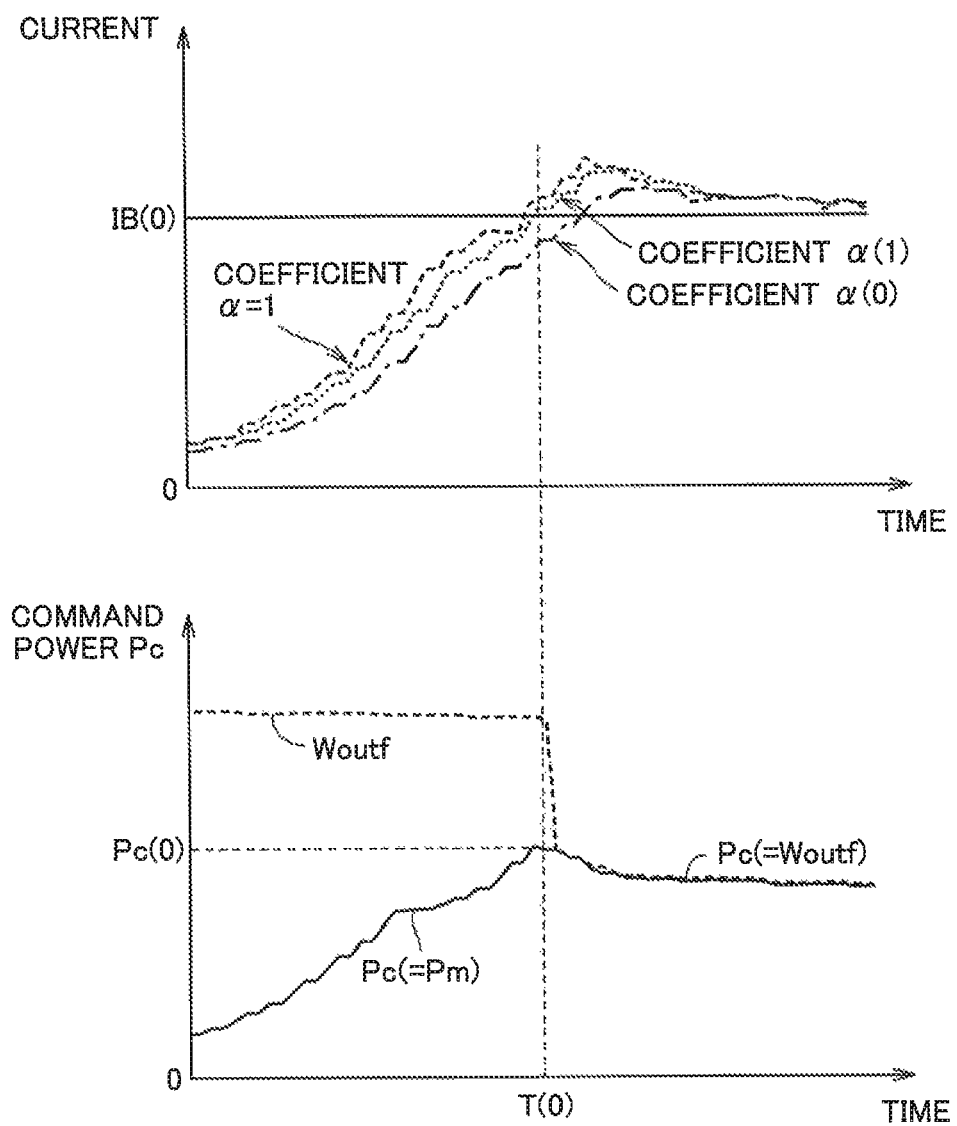
FIG. 13 is a timing chart showing the operation of an ECU mounted on a vehicle according to a first modification of the first embodiment.

The operation of ECU 200 mounted on vehicle 10 according to the present modification will be described below with reference to FIG. 13. It is noted that it is assumed that the second FB term based on voltage VB is zero.

For instance, a case is assumed where the depression amount of the accelerator pedal is increased by a driver to 100% when vehicle 10 is in a stopped state. The increase in depression amount of the accelerator pedal causes, as shown in FIG. 13, current IB and command power Pc to increase as time passes.

At time T(0), when computed value IB(n) of current IB, which is calculated using coefficient α(1), agrees with current upper limit value IB(0) and thus is equal to or more than current upper limit value IB(0) (YES in S100), since there is a divergence between command power Pc(0) and upper limit value Woutf at the time of the agreement (YES in S102), the Woutf addition processing is executed (S104).

At this time, an addition by the absolute value of Wout−Pc (0) is made to the integral term of the first FB term. It is noted that the values of the proportional term and the integral term based on the first deviation of current IB are zero when current IB and current upper limit value IB(0) agree with each other. Therefore, the Woutf side correction amount is Pc(0)−Wout. When the Winf side correction amount is zero, the first FB term is Pc(0)−Wout. Therefore, upper limit value Woutf is Pc(0) according to the sum of the FF term (Wout) and the first FB term.

At and after time T(0), current IB changes, overshooting current upper limit value IB(0). For this reason, the first FB term changes by the absolute value corresponding to the overshoot amount. At this time, the first FB term is calculated using computed value IB(n) calculated using weight coefficient α(1).

In the above-described manner, with the vehicle according to the present embodiment, in addition to the function and effect described in the first embodiment above, use of weight coefficient α(1) to determine an execution condition for the Woutf addition processing or the Winf addition processing enables the Woutf addition processing or the Winf addition processing to be executed earlier than if weight coefficient α(2) were used. For this reason, the amount by which command power Pc overshoots the convergence value can be reduced. Further, use of weight coefficient α(2) less than weight coefficient α(1) to calculate the first FB term enables fluctuations in the first FB term to be suppressed.

Second Modification of First Embodiment

A vehicle according to a second modification of the first embodiment will be described below. As compared with the configuration of vehicle 10 according to the above-described first embodiment, vehicle 10 according to the present modification differs in the operation of ECU 200. Except that point, the vehicle has the same configuration as the configuration of vehicle 10 according to the above-described first embodiment. They have the same reference characters allotted. They also have the same functions. Therefore, a detailed description thereof will not be repeated here.

In the above-described first embodiment, although the Woutf addition processing or the Winf addition processing is described as being executed when there is a divergence between command power Pc and upper limit value Woutf or lower limit value Winf at the time of agreement between current IB and a limit value of current IB, the processing is not particularly limited to be executed at the time of agreement between current IB and a limit value of current IB.

In the present modification, ECU 200 predicts, from an amount of change in current IB, a first point in time that is a predetermined period of time ahead and that is when current IB and a limit value of current IB agree with each other. ECU 200 is further characterized in that when there is a divergence between a predicted value of command power Pc and upper limit value Woutf or lower limit value Winf at the predicted first point in time, ECU 200 brings upper limit value Woutf or lower limit value Winf into agreement with the predicted value of command power Pe the predetermined period of time prior to the first point in time.

Specifically, ECU 200, for example, calculates a period of time that passes before current IB and current upper limit value IB(0) agree with each other, based on the difference IB(0)–IB between current upper limit value IB(0) and current IB and on an amount of change in current IB, ΔIB. When the calculated period of time is not more than a predetermined period of time, ECU 200 further predicts command power Pc after expiration of the predetermined period of time. ECU 200 executes the Woutf addition processing when command power Pc after expiration of the predetermined period of time diverges from upper limit value Woutf.

It is noted that the predetermined period of time is a period of time as to which the delay in communication between current sensor 158 and ECU 200 has been taken into account. ECU 200 calculates the predicted value of command power Pc after expiration of the predetermined period of time, for example, based on the present command power Pc and on an amount of change from a command power Pc' in the previous calculation cycle or an amount of change during a predetermined period in which the previous calculation cycle is the end of the period.

It is noted that the present modification is the same as the configuration of vehicle 10 described in the first embodiment above except that the timing of executing the Woutf addition processing or the Winf addition processing is a predetermined period of time prior to the time of agreement between current IB and current upper limit value IB(0). For this reason, a detailed description thereof will not be repeated.

Figure 14:
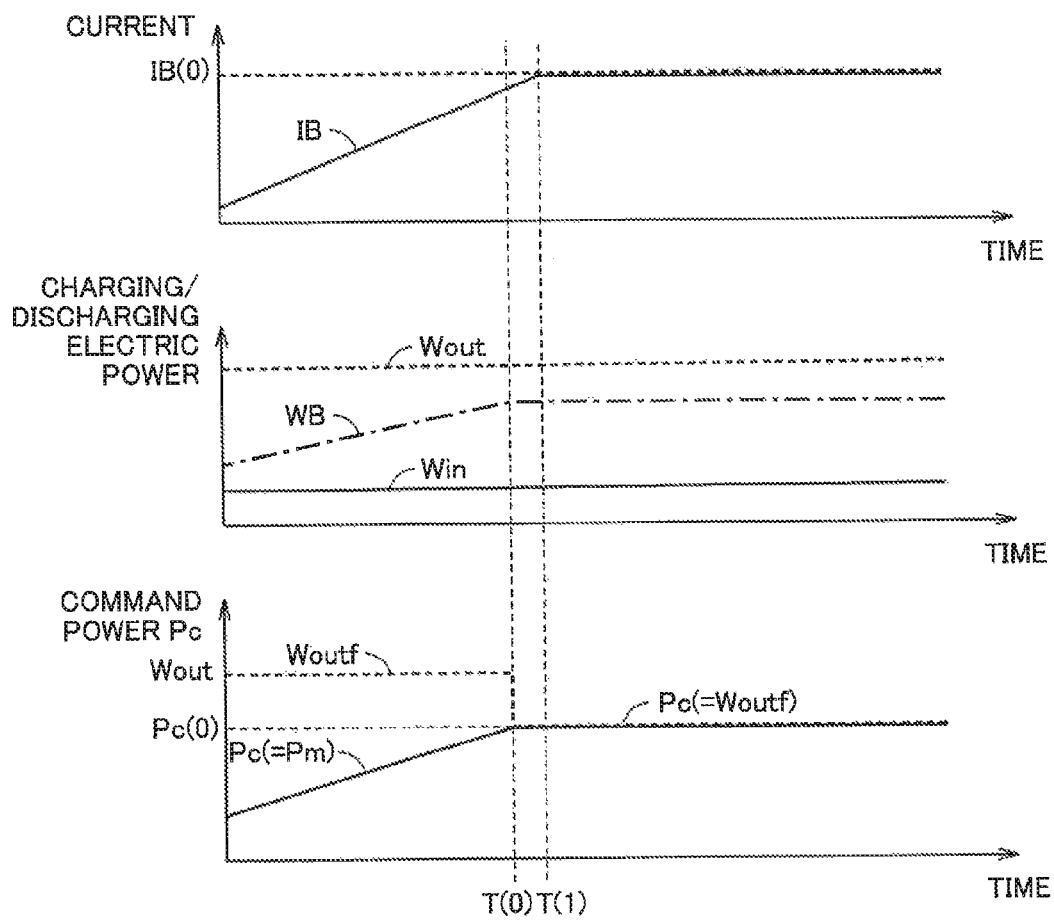
FIG. 14 is a timing chart showing the operation of an ECU mounted on a vehicle according to a second modification of the first embodiment.

The operation of ECU 200 mounted on vehicle 10 according to the present modification will be described below with reference to FIG. 14. It is noted that it is assumed that the second FB term based on voltage VB is zero.

For instance, a case is assumed where the depression amount of the accelerator pedal is increased by a driver to 100% when vehicle 10 is in a stopped state. The increase in depression amount of the accelerator pedal causes, as shown in FIG. 14, current 1B, charging/discharging power WB, and command power Pc to increase as time passes.

At time T(0), the Woutf addition processing is executed when it is determined that it is a predetermined period of time prior to the time (time T(1)) of agreement between current IB and current upper limit value IB(0) and there is a divergence between predicted value Pc'(0) of command power Pc and upper limit value Woutf after the predetermined period of time. At this time, an addition by the magnitude value of Wout−Pc'(0) is made to the integral term.

In the above-described manner, with the vehicle according to the present embodiment, the Woutf addition processing or the Winf addition processing is executed a predetermined period of time prior to the time of agreement between current IB and a limit value. For this reason, an overshoot or undershoot of current 1B due to a delay in communication between current sensor 158 and ECU 200 can be more effectively suppressed. Therefore, a vehicle and a controlling method for a vehicle which change an input/output limit value more rapidly so that a voltage and/or current does not go beyond an allowable range can be provided.

Second Embodiment

A vehicle according to a second embodiment will be hereinafter described. As compared with the configuration of vehicle 10 according to the above-described first embodiment, vehicle 10 according to the present embodiment differs in the operation of ECU 200. Except that point, the vehicle has the same configuration as the configuration of vehicle 10 according to the above-described first embodiment. They have the same reference characters allotted. They also have the same functions. Therefore, a detailed description thereof will not be repeated here.

For example, when voltage VB of main battery 28 is lower than voltage lower limit value VB(1) of the voltage limit range during the discharging of main battery 28, ECU 200 determines, as upper limit value Woutf, a value lower than Wout by the magnitude of the second FB term according to the difference between voltage VB and voltage lower limit value VB(1). The greater the magnitude of the difference between voltage VB and voltage lower limit value VB(1) is, the greater the magnitude of the second FB term is.

For example, when voltage VB of main battery 28 is higher than voltage upper limit value VB(0) of the voltage limit range during the charging of main battery 28, ECU 200 determines, as lower limit value Winf, a value higher than Win by the magnitude of the second FB term according to the difference between voltage VB and voltage upper limit value VB(0). The greater the magnitude of the difference between voltage VB and voltage upper limit value VB(0) is, the greater the magnitude of the second FB term is.

A case is assumed where in vehicle 10 having a configuration as above, a state in which the depression amount of the accelerator pedal is close to 100% is maintained. It is noted that in the following description, it will be assumed that the first FB term is continuously zero.

Figure 15:
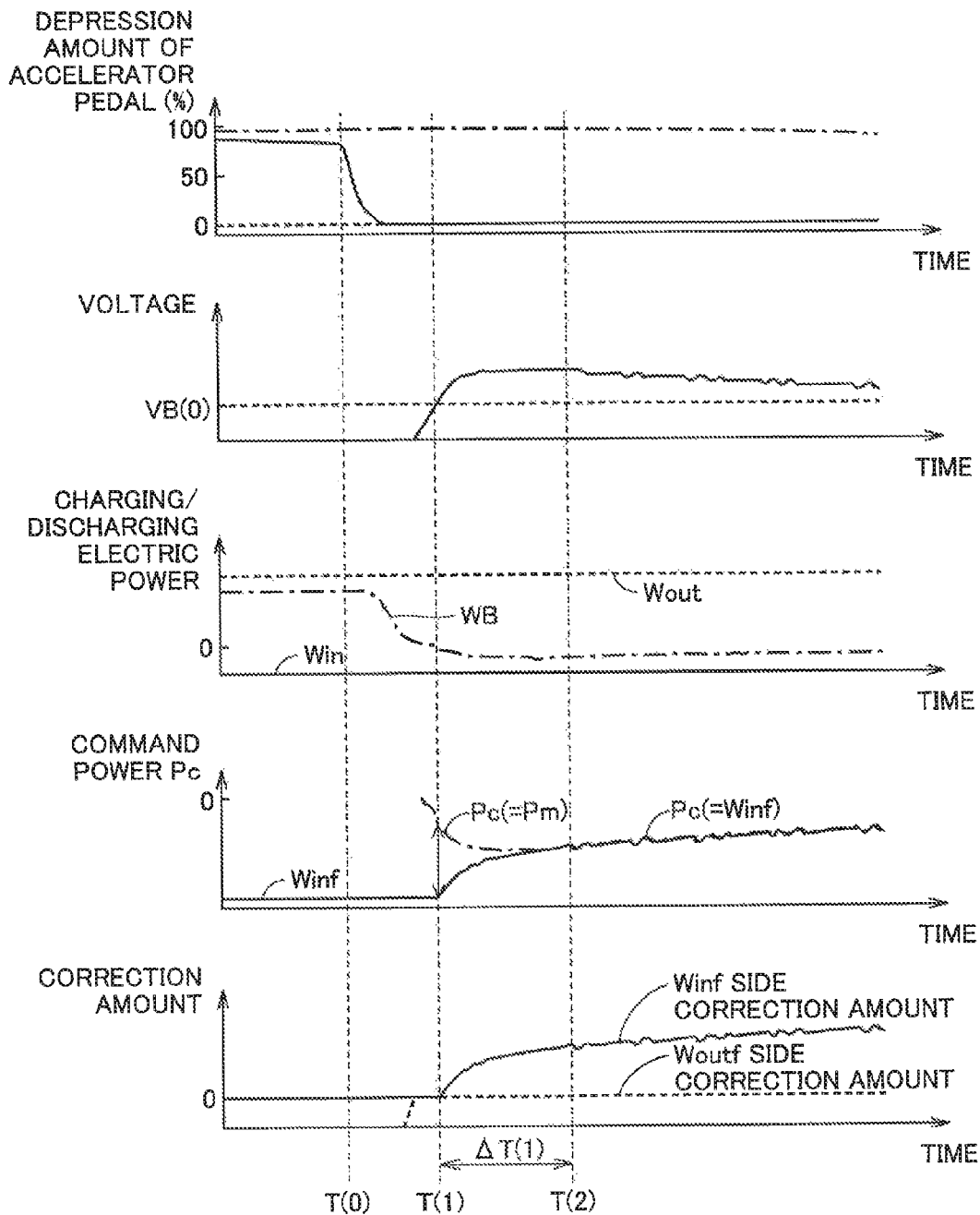
FIG. 15 is a diagram illustrating the operation in which a voltage overshoots a voltage upper limit value.

As shown in FIG. 15, at time T(0), when a driver starts releasing the accelerator pedal from depression, the state in which the depression amount of the accelerator pedal is close to 100% shifts to a state in which it is 0%. At this time, regenerative braking using MG 12 to charge main battery 28 is started. For this reason, after time T(0), the charging of main battery 28 is started, and therefore, voltage VB increases and command power Pc and charging/discharging power WB increase in the negative direction (the charge side).

At time T(1), when voltage VB becomes not less than voltage upper limit value VB(0), the magnitude of Winf side correction amount begins to increase. For this reason, lower limit value Winf begins to increase from time T(1).

At time T(1), vehicle required power Pm has a value greater than lower limit value Winf. For this reason, when the driver continues a state in which the accelerator pedal is released from depression, calculated vehicle required power Pm is determined as command power Pc. That is, even after voltage VB goes beyond voltage upper limit value VB(0), command power Pc continues to increase in the negative direction until vehicle required power Pm agrees with lower limit value Winf. For this reason, the increase in voltage VB continues.

At time T(2), when vehicle required power Pm and lower limit value Winf agree with each other, lower limit value Winf is determined as command power Pc. For this reason, even when vehicle required power Pm is less than lower limit value Winf, command power Pc is restricted to upper limit value Woutf. For this reason, a decrease in command power Pc is suppressed, and therefore, the increase in voltage VB is suppressed. Subsequently, voltage VB decreases.

In this way, a delay of ΔT(1) occurs between time T(1) at which voltage VB becomes not less than voltage upper limit value VB(0) and time T(2) at which command power Pc is restricted. For this reason, in some cases, voltage VB overshoots voltage upper limit value VB(0).

In addition, during the discharging of main battery 28 (that is, during acceleration of the vehicle, for example), voltage VB decreases. For this reason, in the same way, a delay occurs also when voltage VB becomes not more than voltage lower limit value VB(1), between when voltage VB becomes not more than voltage lower limit value VB(1) and when command power Pc is restricted. In this case, voltage VB may undershoot voltage lower limit value VB(1).

Here, the present embodiment is characterized in that ECU 200 brings a boundary value which corresponds to vehicle required power Pm and is one of upper limit value Woutf and lower limit value Winf of the allowable range of electric power into agreement with vehicle required power Pm when there is a divergence between the corresponding boundary value and the vehicle required power at a first point in time when voltage VB agrees with a limit value.

Figure 16:
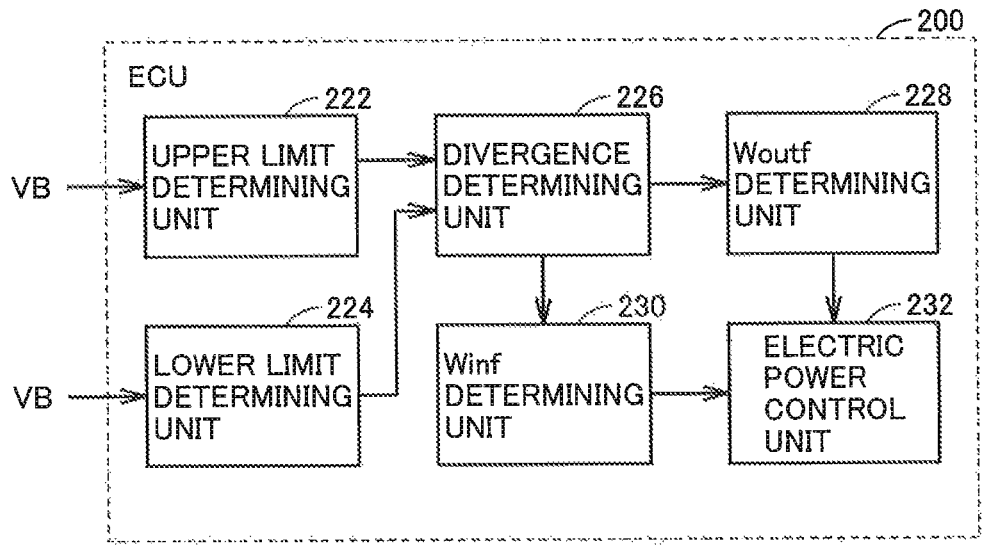
FIG. 16 is a functional block diagram of an ECU mounted on a vehicle according to a second embodiment.

FIG. 16 shows a functional block diagram of ECU 200 mounted on vehicle 10 according to the present embodiment. ECU 200 includes an upper limit determining unit 222, a lower limit determining unit 224, a divergence determining unit 226, a Wout determining unit 228, a Winf determining unit 230, and an electric power control unit 232. It is noted that in the following description, it will be assumed that the first FB term is zero.

Upper limit determining unit 222 determines whether or not voltage VB is equal to or more than voltage upper limit value VB(0). It is noted that upper limit determining unit 222 may, for example, turn on a voltage upper limit determination flag when voltage VB is equal to or more than voltage upper limit value VB(0).

Lower limit determining unit 224 determines whether or not voltage VB is equal to or less than voltage lower limit value VB(1). It is noted that lower limit determining unit 224 may, for example, turn on a voltage lower limit determination flag when voltage VB is equal to or less than voltage lower value VB(1).

Each of voltage upper limit value VB(0) and voltage lower limit value VB(1) is a value for protecting electrical equipment on the electric power transmission path between main battery 28 and MG 12, and may be a predetermined value or may be a value determined depending on the temperature of the electrical equipment (for example, main battery 28 which has a higher internal resistance as the temperature is lower).

Divergence determining unit 226 determines whether or not there is a divergence between command power Pc and upper limit value Woutf at the time of agreement of voltage VB with the voltage limit value. In addition, divergence determining unit 226 determines whether or not there is a divergence between command power Pc and lower limit value Winf at the time of agreement of voltage VB with the voltage limit value. It is noted that the operation of divergence determining unit 226 is the same as the operation of divergence determining unit 206 described using FIG. 6 in the first embodiment, except that determination of divergence is made at the time of agreement of voltage VB with the voltage limit value. For this reason, a detailed description thereof will not be repeated.

Woutf determining unit 228 determines upper limit value Woutf according to the sum of the FF teim and the FB term as described in the first embodiment when a first execution condition is satisfied. In the present embodiment, the first execution condition includes a condition that voltage VB and voltage lower limit value VB(1) agree with each other and that there is a divergence between command power Pc and upper limit value Woutf at the time of the agreement. When the first execution condition is satisfied, Woutf determining unit 228 brings upper limit value Woutf into agreement with command power Pc at the time of agreement between voltage VB and voltage lower limit value VB(1). Specifically, Woutf determining unit 228 executes the Woutf addition processing when the first execution condition is satisfied.

In the present embodiment, in executing the Woutf addition processing, Woutf determining unit 228 calculates the integral term of the second FB term such that the second FB term has a magnitude greater by the magnitude value of Wout−Pc. It is noted that in executing the Woutf addition processing, Woutf determining unit 228 may calculate the proportional term of the second FB term such that the second FB term has a magnitude greater by the magnitude value of Wout−Pc. Alternatively, Woutf determining unit 228 may calculate the second FB term by making an addition to the sum of the integral term and the proportional term by the magnitude of Wout−Pc.

It is noted that, for example, when the voltage lower limit determination flag and the upper limit divergence determination flag are both in an ON state, Woutf determining unit 228 may determine command power Pc at a point in time when both of the flags have entered the ON state, as upper limit value Woutf.

Winf determining unit 230 determines lower limit value Winf according to the sum of the FF term and the FB term in the manner as described in the first embodiment when a second execution condition is satisfied. In the present embodiment, the second execution condition includes a condition that voltage VB and voltage upper limit value VB(0) agree with each other and that there is a divergence between command power Pc and lower limit value Winf at the time of the agreement. When the second execution condition is satisfied, Winf determining unit 230 brings lower limit value Winf into agreement with command power Pc at the time of agreement between voltage VB and voltage upper limit value VB(0). Specifically, when the second execution condition is satisfied, Winf determining unit 230 executes the Winf addition processing.

In the present embodiment, in executing the Winf addition processing, Winf determining unit 230 calculates the integral term of the second FB term such that the second FB term has a magnitude greater by the magnitude of Pc−Win. It is noted that in executing the Winf addition processing, Winf determining unit 230 may calculate the proportional term of the second FB term such that the second FB term has a magnitude greater by the magnitude of Pc−Win. Alternatively, Winf determining unit 230 may calculate the second FB term by making an addition to the sum of the integral term and the proportional term by the magnitude of Pc−Win.

It is noted that, for example, when the voltage upper limit determination flag and the lower limit divergence determination flag are both in an ON state, Winf determining unit 230 may determine command power Pc at a point in time when both of the flags have entered the ON state, as lower limit value Winf.

Electric power control unit 232 controls MG 12 in accordance with command power Pc. Electric power control unit 232 generates the inverter drive signal and the boost converter drive signal and sends the generated drive signals to PCU 16.

In the present embodiment, although upper limit determining unit 222, lower limit determining unit 224, divergence determining unit 226, Woutf determining unit 228, Winf determining unit 230, and electric power control unit 232 are all described as functioning as software which is implemented through execution of a program stored in a memory by the CPU of ECU 200, they may be implemented by hardware. It is noted that such a program is recorded in a storage medium for installation in the vehicle.

Figure 17:
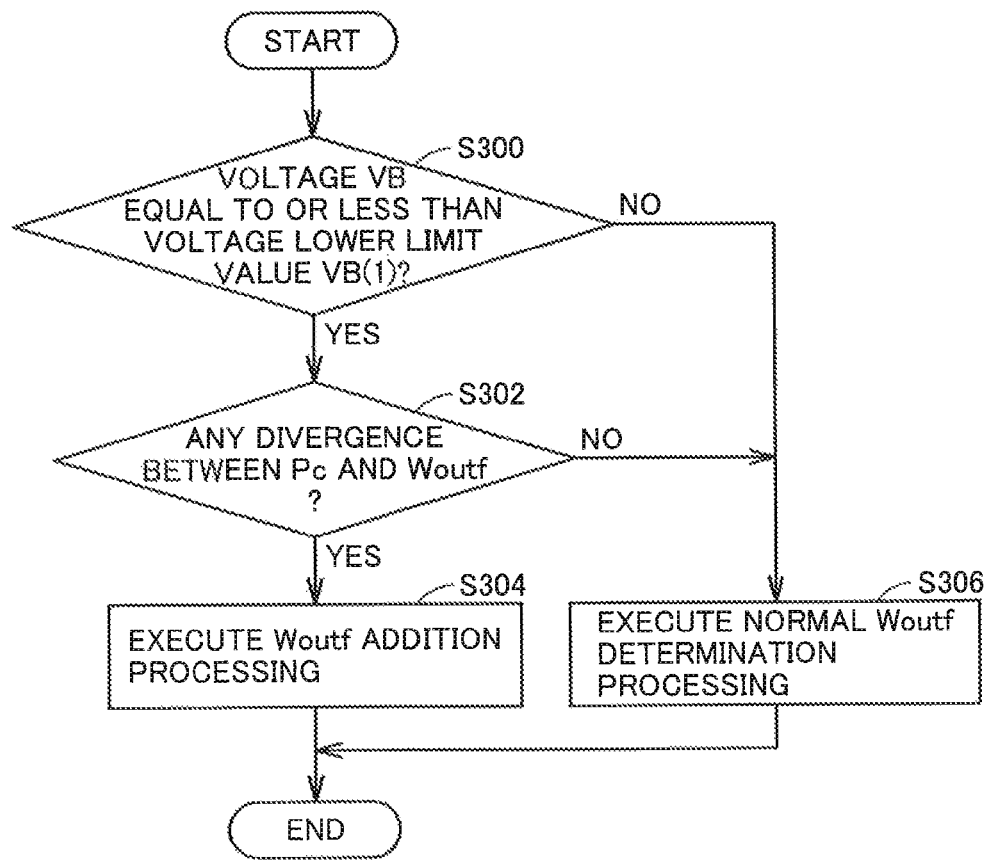
FIG. 17 is a flowchart (No. 1) showing a control structure of a program executed in the ECU mounted on the vehicle according to the second embodiment.

Referring to FIG. 17, a description will be given of a control structure of a program which is executed in ECU 200 mounted on vehicle 10 according to the present embodiment and determines upper limit value Woutf. ECU 200 executes a program based on a flowchart shown in FIG. 17 for each predetermined calculation cycle.

In S300, ECU 200 determines whether or not voltage VB is equal to or less than voltage lower limit value VB(1). If voltage VB is equal to or less than voltage lower limit value VB(1) (YES in S300), the process shifts to S302. If not (NO in S300), the process shifts to S306.

In S302, ECU 200 determines whether or not there is a divergence between command power Pc and upper limit value Woutf at the time of agreement between voltage VB and voltage lower limit value VB(1). It is noted that how to determine whether or not there is a divergence is as described above, and therefore, a detailed description thereof will not be repeated. If there is a divergence between command power Pc and upper limit value Woutf (YES in S302), the process shifts to S304. If not (NO in S302), the process shifts to S306.

In S304, ECU 200 executes the Woutf addition processing to determine upper limit value Woutf. It is noted that the Woutf addition processing is as described above, and therefore, a detailed description thereof will not be repeated. In S306, ECU 200 executes the normal Woutf determination processing to determine upper limit value Woutf. That is, ECU 200 determines upper limit value Woutf from the sum of the FF term and the FB term.

Next, referring to FIG. 18, a description will be given of a control structure of a program which is executed in ECU 200 mounted on vehicle 10 according to the present embodiment and determines lower limit value Winf. ECU 200 executes a program based on a flowchart shown in FIG. 18 for each predetermined calculation cycle.

In S400, ECU 200 determines whether or not voltage VB is equal to or more than voltage upper limit value VB(0). If voltage VB is equal to or more than voltage upper limit value VB(0) (YES in S400), the process shifts to S402. If not (NO in S400), the process shifts to S406.

In S402, ECU 200 determines whether or not there is a divergence between command power Pc and lower limit value Winf at the time of agreement between voltage VB and voltage upper limit value VB(0). It is noted that how to determine whether or not there is a divergence is as described above, and therefore, a detailed description thereof will not be repeated. If there is a divergence between command power Pc and lower limit value Winf (YES in S402), the process shifts to S404. If not (NO in S402), the process shifts to S406.

In S404, ECU 200 executes the Winf addition processing to determine lower limit value Winf. It is noted that the Winf addition processing is as described above, and therefore, a detailed description thereof will not be repeated. In S406, ECU 200 executes the normal Winf determination processing to determine lower limit value Winf. That is, ECU 200 determines lower limit value Winf from the sum of the FP term and the FB term.

Figure 19:
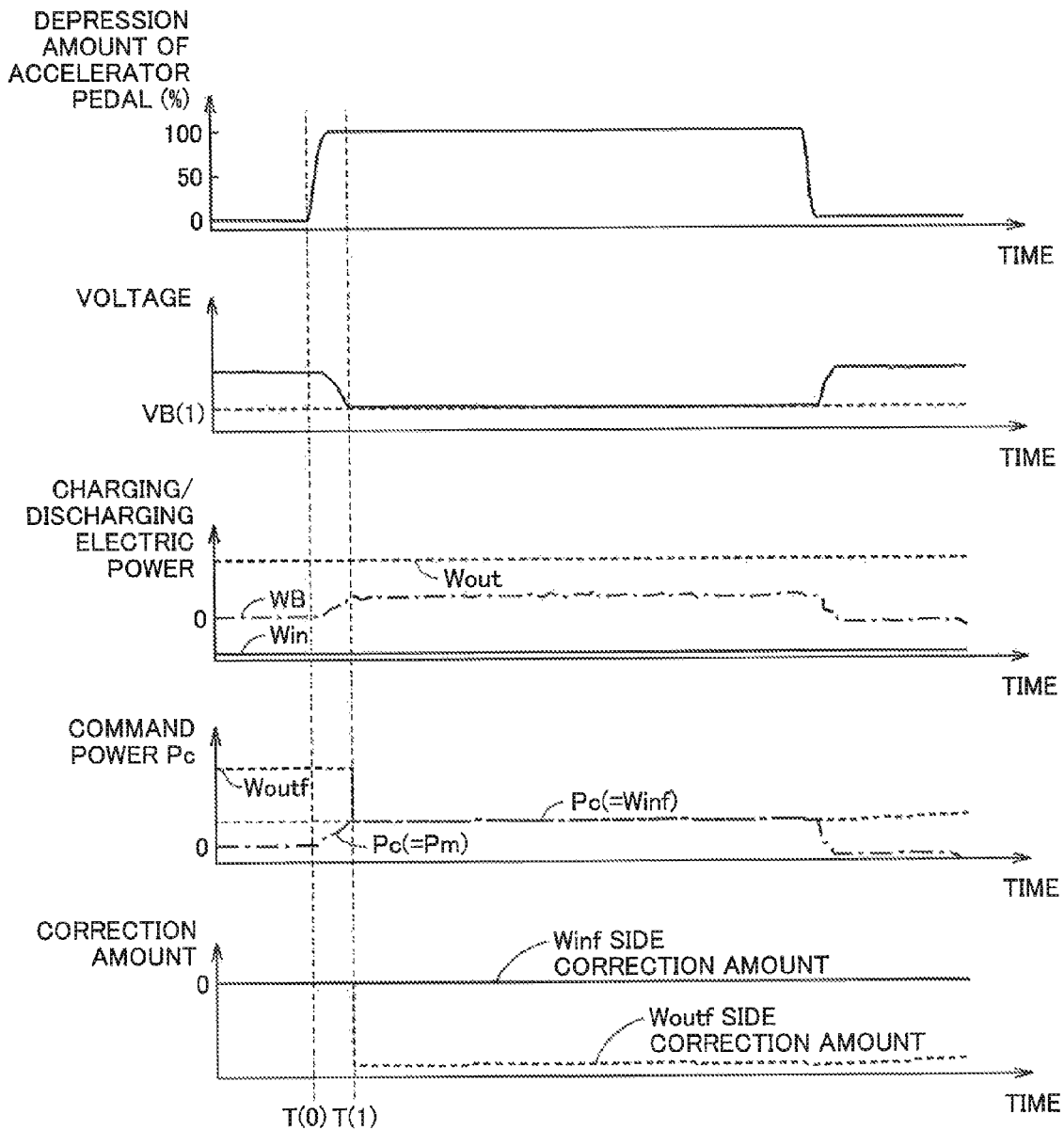
FIG. 19 is a timing chart (No. 1) showing the operation of the ECU mounted on the vehicle according to the second embodiment.
Figure 20:
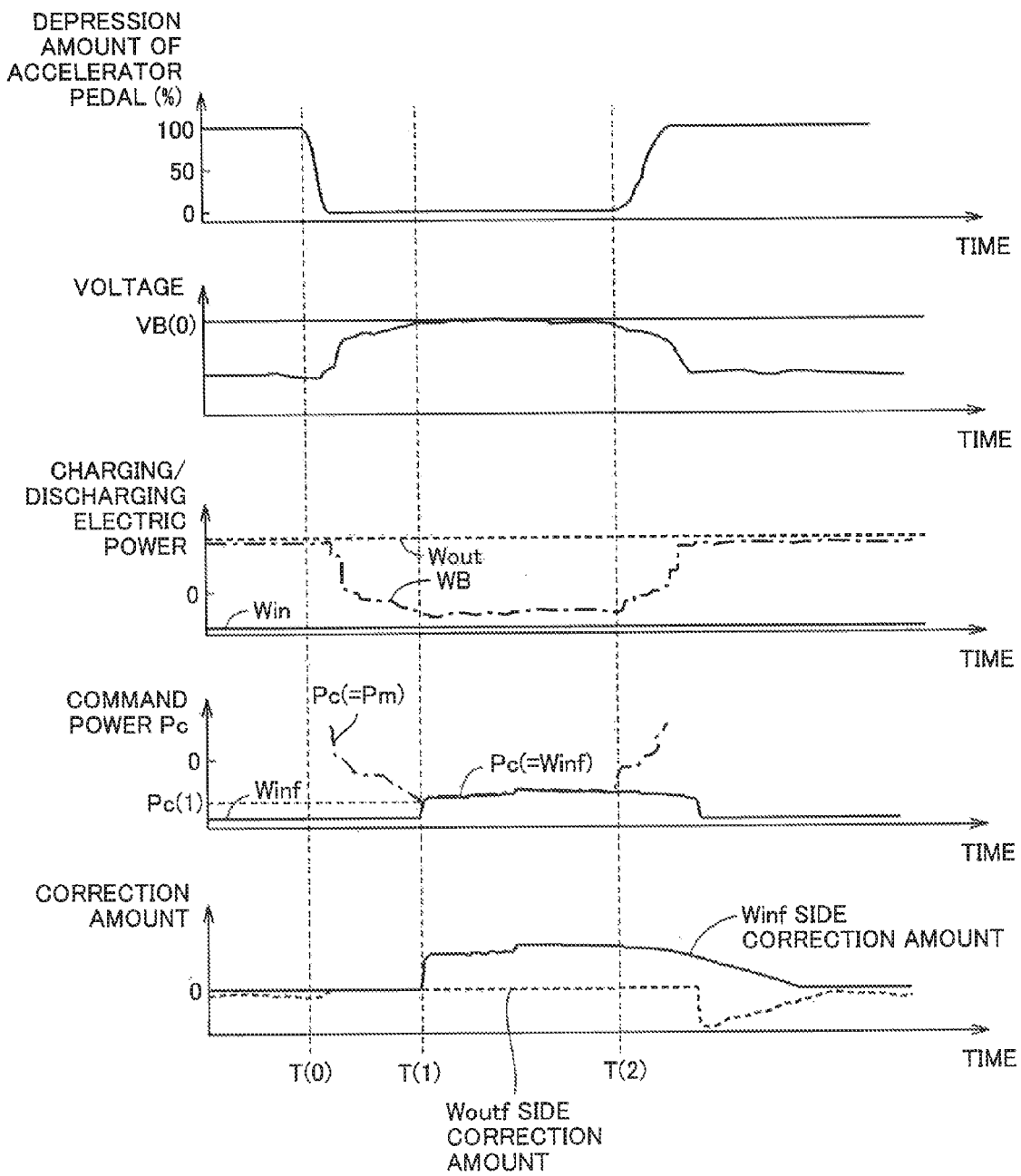
FIG. 20 is a timing chart (No. 2) showing the operation of the ECU mounted on the vehicle according to the second embodiment.

Referring to FIGS. 19 and 20, a description will be given of the operation of ECU 200 mounted on vehicle 10 according to the present embodiment based on the structure and flowcharts as above. It is noted that it is assumed that the first FB term based on current IB is zero.

Case where Voltage VB is Equal to or Less than Voltage Lower Limit Value VB(1)

For instance, a case is assumed where vehicle 10 is in a stopped state. At this time, when the depression amount of the accelerator pedal is 0%, no electric power is supplied to MG 12. For this reason, as shown in FIG. 19, charging/discharging power WB, command power Pc, and the second FB term are substantially zero. As a result, upper limit value Woutf is a value identical with Wout.

At time T(0), when a driver starts depressing the accelerator pedal, electric power is supplied to MG 12, and vehicle 10 starts traveling. Subsequently, the driver increases the depression amount of the accelerator pedal until the depression amount of the accelerator pedal reaches 100%. For this reason, voltage VB begins to decrease toward voltage lower limit value VB(1).

At time T(1), when voltage VB agrees with voltage lower limit value VB(1) and thus is equal to or less than voltage lower limit value VB(1) (YES in S300), there is a divergence between command power Pc(0) and upper limit value \Vaud at the time of the agreement (YES in S302). For this reason, the Woutf addition processing is executed (S304). For this reason, at time T(1), upper limit value Woutf is brought into agreement with Pc(0).

At this time, an addition is made to the integral term of the second FB term by the magnitude of Wout−Pc(0). It is noted that values of the proportional term and the integral term of the second FB term based on a deviation between voltage VB and voltage lower limit value VB(1) are zero when voltage VB and voltage lower limit value VB(1) agree with each other. Therefore, the Woutf side correction amount is Pc(0)−Wout. When the Winf side correction amount is zero, the second FB term is Pc(0)−Wout. For this reason, upper limit value Woutf is Pc(0) according to the sum of the FF term (Wout) and the second FB term.

For this reason, at and after time T(1), ECU 200 determines upper limit value Woutf, i.e. Pc(0) as command power Pc even when vehicle required power Pm is greater than Pc(0).

As a result, an increase in command power Pc is suppressed, and therefore, the decrease in voltage VB is suppressed. Also, when a state in which voltage VB agrees with voltage lower limit value VB(1) continues (YES in S300), command power Pc and upper limit value Woutf do not diverge from each other (NO in S300). For this reason, upper limit value Woutf is determined through the normal Woutf determination processing (S306). At this time, since the deviation between voltage VB and voltage lower limit value VB(1) is zero, the value of the second FB term in the previous calculation cycle is maintained. This results in that upper limit value Woutf is a value identical with Pc(0).

Case where Voltage VB is Equal to or More than Voltage Upper Limit Value VB(0)

As shown in FIG. 20, a case is assumed where a state in which the depression amount of the accelerator pedal is 100% is maintained. At this time, main battery 28 is in a discharging state supplying electric power to MG 12.

At time T(0), when a driver releases the accelerator pedal from depression, causing the depression amount of the accelerator pedal to be 0%, regenerative breaking using MG 12 is performed. For this reason, voltage VB begins to increase from time T(0).

At time T(1), when voltage VB agrees with voltage upper limit value VB(0) and thus is equal to or more than voltage upper limit value VB(0) (YES in S400), there is a divergence between command power Pc(1) and lower limit value Winf at the time of the agreement (YES in S402). For this reason, the Winf addition processing is executed (S404).

At this time, an addition by the magnitude value of Pc(1)–Win is made to the integral term of the second FB term. It is noted that the values of the proportional term and the integral term based on a deviation between voltage VB and voltage upper limit value VB(0) are zero when voltage VB and voltage upper limit value VB(0) agree with each other. Therefore, the Winf side correction amount is Pc(1)–Win. When the Woutf side correction amount is zero, the second FB term is Pc(1)–Win. Therefore, lower limit value Winf is Pc(1) according to the sum of the FF term (Win) and the second FB term.

For this reason, at and after time T(1), ECU 200 determines lower limit value Winf, i.e. Pc(1) as command power Pc even when vehicle required power Pm is less than Pc(1).

As a result, a decrease in command power Pc is suppressed, and therefore, the increase in voltage V13 is suppressed. Also, when a state in which voltage VB agrees with voltage upper limit value VB(0) continues (YES in S400), command power Pc and lower limit value Winf do not diverge from each other (NO in S402). For this reason, lower limit value Winf is determined through the normal Winf determination processing (S406). At this time, since the deviation between voltage VB and voltage upper limit value VB(0) is zero, the value of the second FB term in the previous calculation cycle is maintained. This results in that lower limit value Winf is a value identical with Pc(1).

At time T(2), when the driver again depresses the accelerator pedal, causing the depression amount of the accelerator pedal to increase, MG 12 enters the discharging state, and therefore, voltage VB decreases below voltage upper limit value. VB(0) (NO in S400). For this reason, lower limit value Winf is determined through the normal Winf determination processing (S406).

At this time, a change in voltage VB causes a change in the deviation between voltage VB and voltage upper limit value VB(0), and the magnitude of the second FB term begins to decrease.

In the above-described manner, with the vehicle according to the present embodiment, the Woutf addition processing is executed at the time of agreement between voltage V13 and voltage lower limit value VB(1), so that an increase in command power Pc is suppressed at and after the time of agreement between voltage VB and voltage lower limit value VB(1). For this reason, an undershoot of voltage VB relative to voltage lower limit value VB(1) is suppressed. Further, the Winf addition processing is executed at the time of agreement between voltage VB and voltage upper limit value VB(0), so that an increase in command power Pc is suppressed at and after the time of agreement between voltage VB and voltage upper limit value VB(0). For this reason, an overshoot of voltage VB relative to voltage upper limit value VB(0) is suppressed. Therefore, a vehicle and a control method for a vehicle which change an input/output limit value more rapidly so that a voltage and/or current does not go beyond an allowable range can be provided.

Third Embodiment

A vehicle according to a third embodiment will be hereinafter described. As compared with the configuration of vehicle 10 according to the above-described second embodiment, vehicle 10 according to the present embodiment differs in the operation of ECU 200. Except that point, the vehicle has the same configuration as the configuration of vehicle 10 according to the above-described second embodiment. They have the same reference characters allotted. They also have the same functions. Therefore, a detailed description thereof will not be repeated here.

Figure 21:
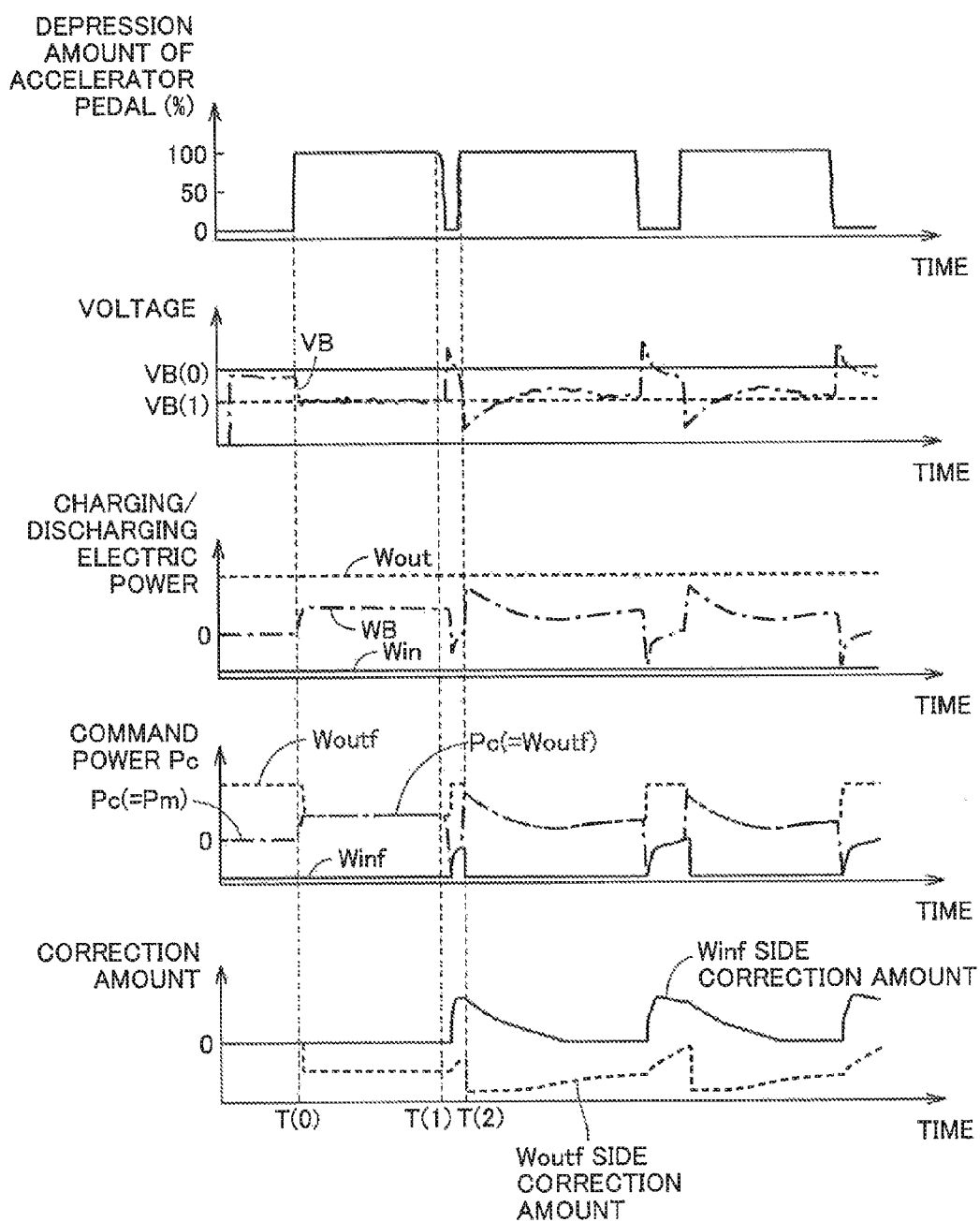
FIG. 21 is a diagram illustrating the operation in which a voltage overshoots a voltage upper limit value and undershoots a voltage lower limit value.

The operation of ECU 200 according to the flowcharts described in FIG. 17 and FIG. 18 will be described using FIG. 21. It is noted that it is assumed that the first FB term based on current IB is zero.

For instance, a case is assumed where vehicle 10 is in a stopped state. As shown in FIG. 21, at time T(Q), when a driver starts depressing the accelerator pedal, electric power is supplied to MG 12, and vehicle 10 starts traveling. Subsequently, the driver increases the depression amount of the accelerator pedal until the depression amount of the accelerator pedal reaches 100%. For this reason, voltage VB begins to decrease toward voltage lower limit value VB(1).

When Voltage VB is equal to or less than voltage lower limit value VB(1) (YES in S300), there is a divergence between command power Pc and upper limit value Woutf at the time of agreement between voltage VB and voltage lower limit value VB(1) (YES in S302). For this reason, the Woutf addition processing is executed (S304).

At time T(1), when the driver starts releasing the accelerator pedal from depression, causing the depression amount of the accelerator pedal to be 0%, regenerative braking using MG 12 is performed. For this reason, voltage VB begins to increase from time T(1). In addition, vehicle required power Pm begins to increase in the negative direction.

When Voltage VB is equal to or more than voltage upper limit value VB(0) (YES in S400), there is a divergence between command power Pc and lower limit value Winf at the time of agreement between voltage VB and voltage upper limit value VB(0) (YES in S402). For this reason, the Winf addition processing is executed (S404).

Further, at time T(2), when voltage VB is equal to or less than voltage lower limit value VB(1) (YES in S300), there is a divergence between command power Pc and upper limit value Woutf at the time of agreement between voltage VB and voltage lower limit value VB(1) (YES in S302). For this reason, the Woutf addition processing is executed (S304).

At time T(2), however, when the Winf addition processing is executed, the Winf side correction amount and the Woutf side correction amount are both not zero. For this reason, in some cases, the Winf addition processing cannot be performed appropriately, and voltage VB exceeds voltage upper limit value VB(0).

In the same manner, at time T(3), when the Woutf addition processing is executed, the Winf side correction amount and the Woutf side correction amount are both not zero. For this reason, in some cases, the Woutf addition processing cannot be performed appropriately, and voltage VB is below voltage lower limit value VB(1).

Here, in the present embodiment, when voltage VB is not less than voltage lower limit value VB(1) and there is a divergence between command power Pc and upper limit value Woutf at the time of agreement between voltage VB and voltage lower limit value VB(1), ECU 200 sets the Winf side correction amount at the time of the agreement, to zero.

Further, in the present embodiment, when voltage VB is not more than voltage upper limit value VB(0) and there is a divergence between command power Pc and lower limit value Winf at the time of agreement between voltage VB and voltage upper limit value VB(0), ECU 200 sets the Woutf side correction amount at the time of the agreement, to zero.

Figure 22:
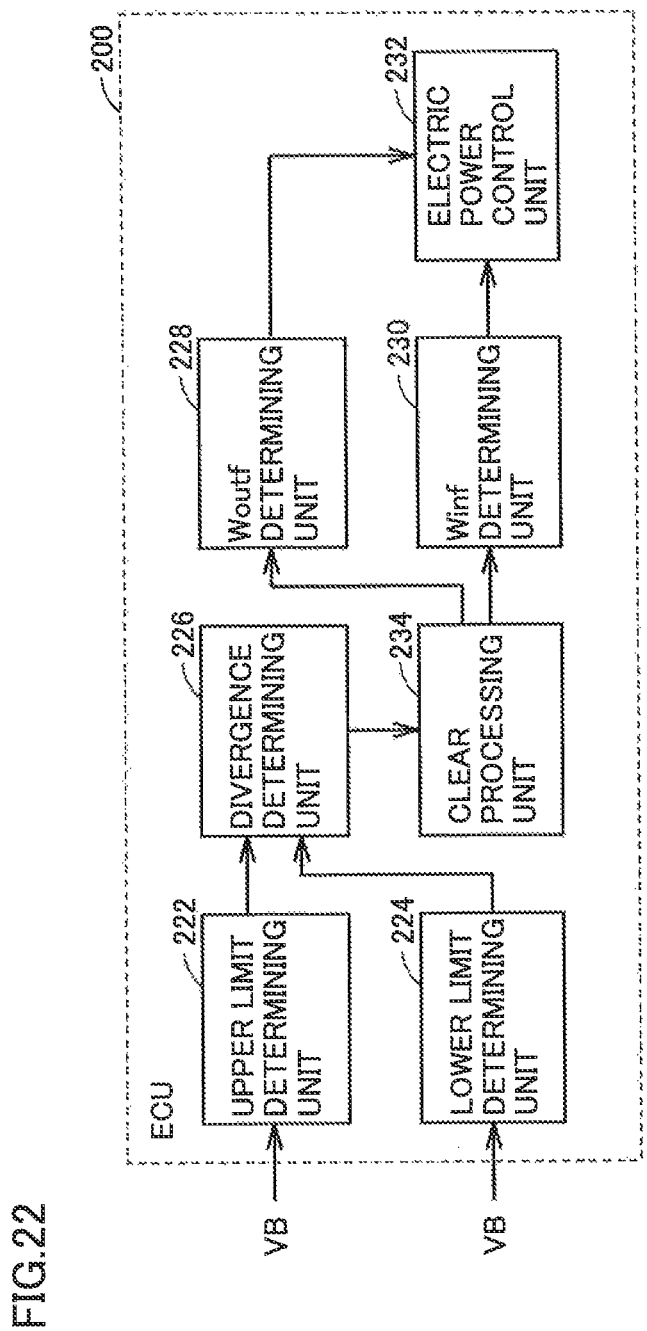
FIG. 22 is a functional block diagram of an ECU mounted on a vehicle according to a third embodiment.

FIG. 22 shows a functional block diagram of ECU 200 mounted on vehicle 10 according to the present embodiment. It is noted that as compared with the functional block diagram of ECU 200 in the second embodiment shown in FIG. 16, the functional block diagram of ECU 200 shown in FIG. 22 differs in that ECU 200 further includes a clear processing unit 234, Except that point, the diagram has the same configuration as the configuration of the functional block diagram of ECU 200 in the second embodiment shown in FIG. 16. For this reason, a detailed description thereof will not be repeated.

Clear processing unit 234 sets the Winf side correction amount to zero before upper limit value Woutf is determined when Woutf determining unit 228 determines upper limit value Woutf. Specifically, clear processing unit 234 sets the Winf side correction amount to zero when voltage VB is not more than voltage lower limit value VB(1) and there is a divergence between command power Pc and upper limit value Woutf at the time of agreement between voltage VB and voltage lower limit value VB(1). It is noted that when the voltage lower limit determination flag is ON and the upper limit divergence determination flag is also in an ON state, clear processing unit 234 may set the Winf side correction amount to zero at a point in time when both of the flags have entered the ON state.

Further, clear processing unit 234 sets the Woutf side correction amount to zero before lower limit value Winf is determined when Winf determining unit 230 determines lower limit value Winf. Specifically, clear processing unit 234 sets the Woutf side correction amount to zero when voltage VB is not less than a voltage upper limit value VB(0) and there is a divergence between command power Pc and lower limit value Winf at the time of agreement between voltage VB and voltage upper limit value VB(0). It is noted that when the voltage upper limit determination flag is ON and the lower limit divergence determination flag is also in an ON state, clear processing unit 234 may set the Woutf side correction amount to zero at a point in time when both of the flags have entered the ON state.

In the present embodiment, although upper limit determining unit 222, lower limit determining unit 224, divergence determining unit 226, Woutf determining 228, Winf determining unit 230, electric power control unit 232, and clear processing unit 234 are all described as functioning as software which is implemented through execution of a program stored in a memory by the CPU of ECU 200, they may be implemented by hardware, it is noted that such a program is recorded in a storage medium for installation in the vehicle.

Figure 23:
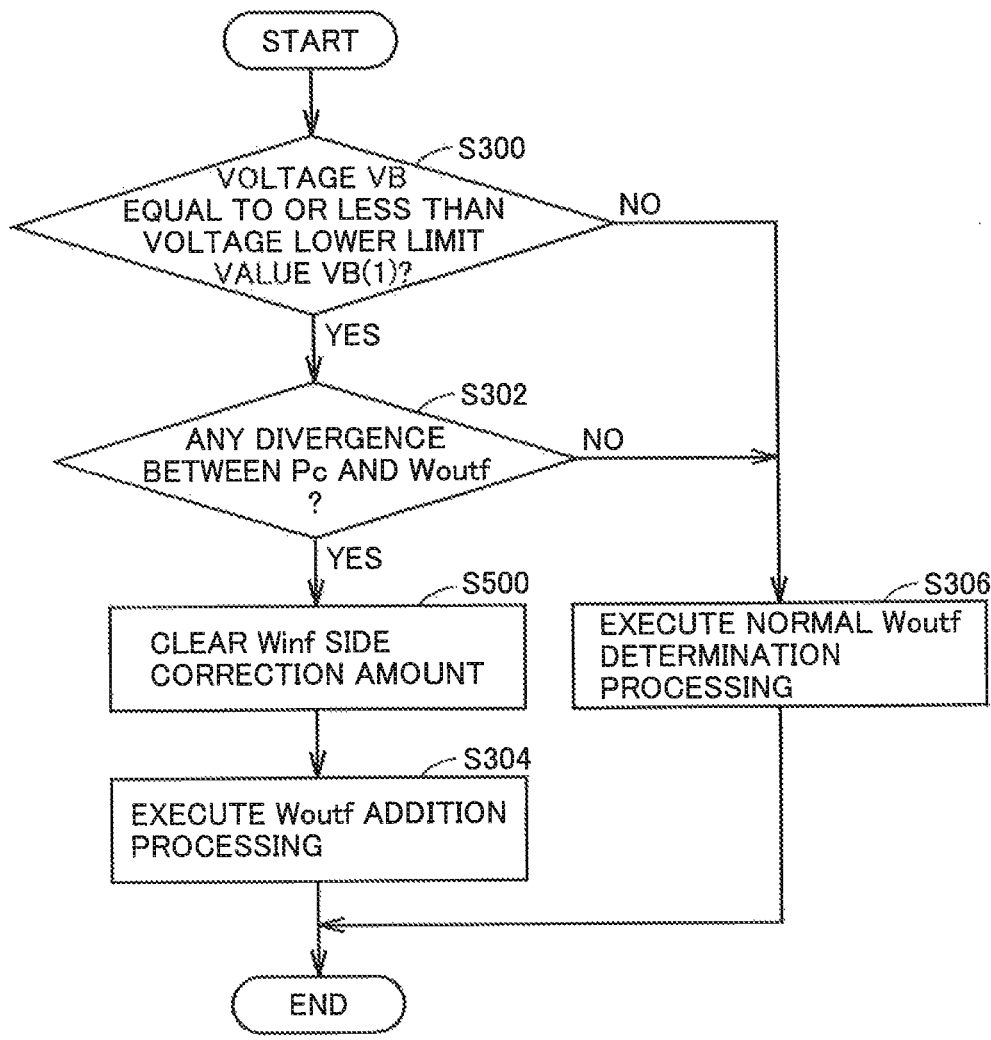
FIG. 23 is a flowchart (No. 1) showing a control structure of a program executed in the ECU mounted on the vehicle according to the third embodiment.

Referring to FIG. 23, a description will be given of a control structure of a program which is executed in ECU 200 mounted on vehicle 10 according to the present embodiment and determines upper limit value Woutf, ECU 200 executes a program based on a flowchart shown in FIG. 23 for each predetermined calculation cycle.

It is noted that in the flowchart shown in FIG. 23, the same processes as those in the flowchart shown in FIG. 17 described before have the same step numbers allotted. They also have the same processes with regard thereto. Therefore, a detailed description thereof will not be repeated here.

When it is determined in S302 that there is a divergence between command power Pc and upper limit value Woutf at the time of agreement between voltage VB and voltage lower limit value VB(i) (YES in S302), in S500, ECU 200 clears the Winf side correction amount. That is, ECU 200 sets Winf side correction amount to zero.

Figure 24:
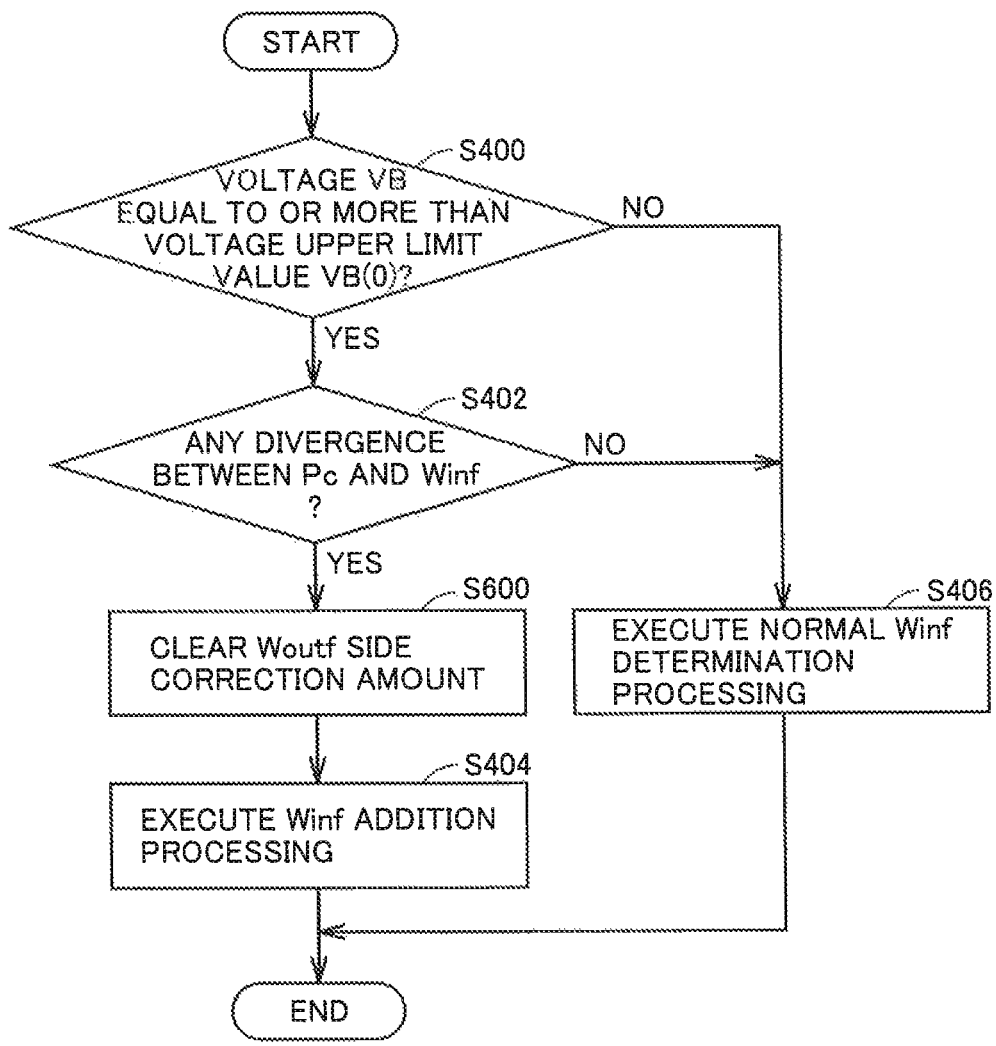
FIG. 24 is a flowchart (No. 2) showing a control structure of a program executed in the ECU mounted on the vehicle according to the third embodiment.

Referring to FIG. 24, a description will be given of a control structure of a program which is executed in ECU 200 mounted on vehicle 10 according to the present embodiment and determines lower limit value Winf. ECU 200 executes a program based on a flowchart shown in FIG. 24 for each predetermined calculation cycle.

Figure 18:
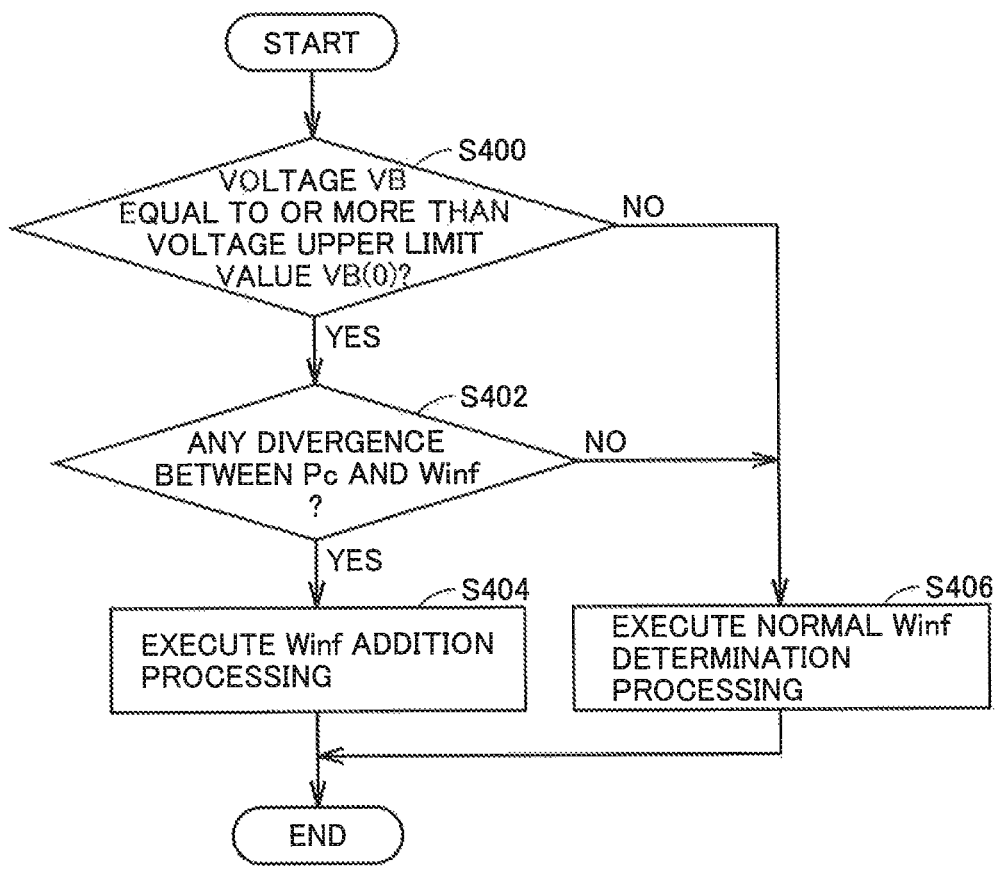
FIG. 18 is a flowchart (No. 2) showing a control structure of a program executed in the ECU mounted on the vehicle according to the second embodiment.

It is noted that in the flowchart shown in FIG. 24, the same processes as those in the flowchart shown in FIG. 18 described before have the same step numbers allotted. They also have the same processes with regard thereto. Therefore, a detailed description thereof will not be repeated here.

When it is determined in S402 that there is a divergence between command power Pc and lower limit value Winf at the time of agreement between voltage VB and voltage upper limit value VB(0) (YES in S402), in S600, ECU 200 clears the Woutf side correction amount. That is, ECU 200 sets the Woutf side correction amount to zero.

Figure 25:
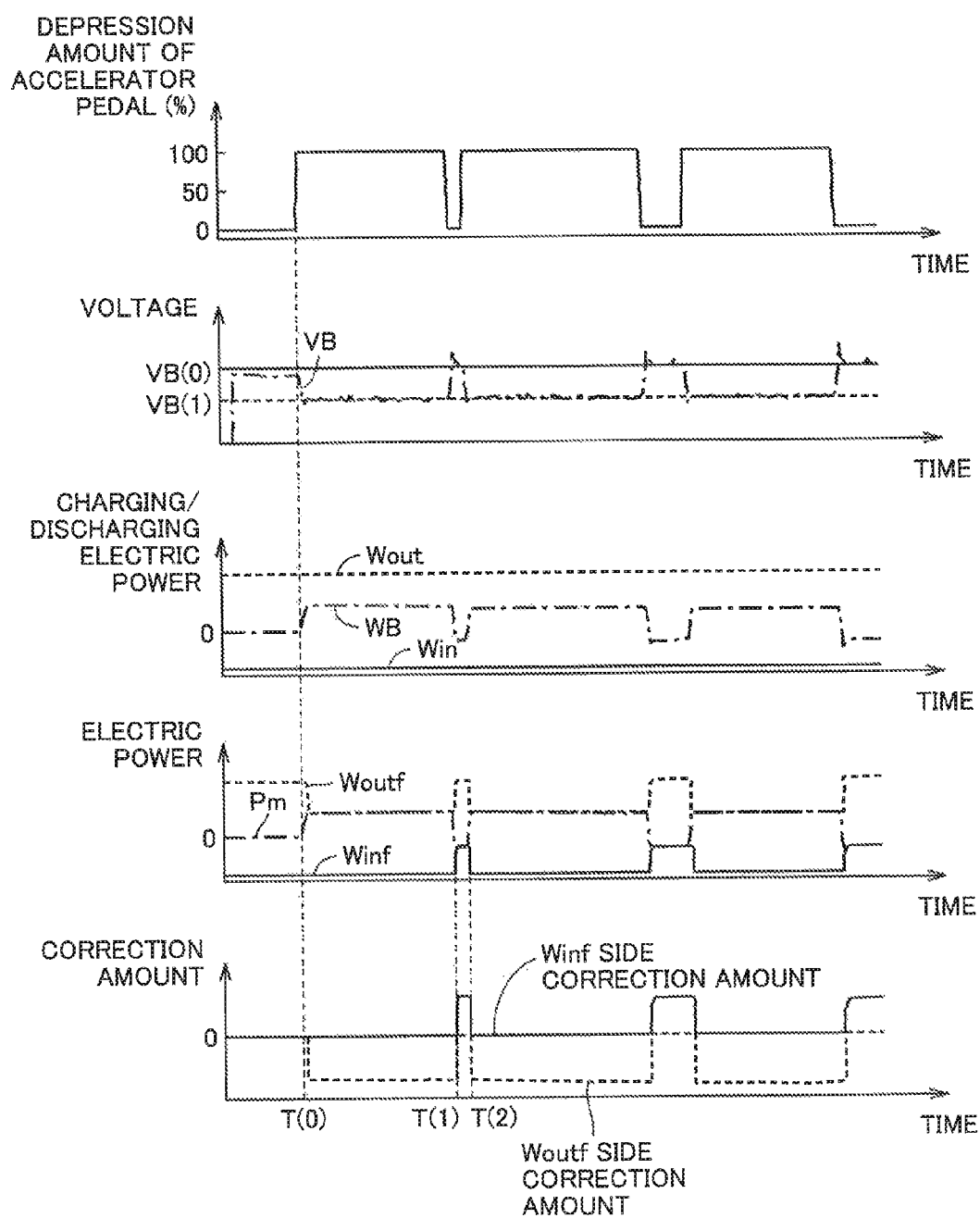
FIG. 25 is a timing chart showing the operation of the ECU mounted on the vehicle according to the third embodiment.

Referring to FIG. 25, a description will be given of the operation of ECU 200 mounted on the vehicle according to the present embodiment based on the structure and flowcharts as above. It is noted that it is assumed that the first FB term based on current IB is zero.

For instance, a case is assumed where vehicle 10 is in a stopped state. As shown in FIG. 25, at time T(0), when a driver starts depressing the accelerator pedal, electric power is supplied to MG 12, and vehicle 10 starts traveling. Subsequently, the driver increases the depression amount of the accelerator pedal until the depression amount of the accelerator pedal reaches 100%. For this reason, voltage VB begins to decrease toward voltage lower limit value VB(1).

When Voltage VB is equal to or less than voltage lower limit value VB(1) (YES in S300), there is a divergence between command power Pc and upper limit value Woutf at the time of agreement between voltage VB and voltage lower limit value VB(1) (YES in S302). For this reason, the Winf side correction amount is cleared (S500), and then, Woutf addition processing is executed (S304).

At Time T(1), when the driver starts releasing the accelerator pedal from being depressed, causing the depression amount of the accelerator pedal to be 0%, regenerative braking using MG 12 is performed. For this reason, voltage VB begins to increase from time T(1). In addition, vehicle required power Pm begins to increase in the negative direction.

When Voltage VB is equal to or more than voltage upper limit value VB(0) (YES in S400), there is a divergence between command power Pc and lower limit value Winf at the time of agreement between voltage VB and voltage upper limit value VB(0) (YES in S402). For this reason, the Woutf side correction amount is cleared (S600), and then the Winf addition processing is executed (S404).

Since the Woutf side correction amount is set to zero, the second FB term is an appropriate value for bringing lower limit value Winf into agreement with command power Pc at the time of agreement between voltage VB and voltage upper limit value VB(0). As a result, the Winf addition processing is executed appropriately. Therefore, the amount by which voltage VB overshoots voltage upper limit value VB(0) is reduced as compared with a case where the Woutf side correction amount is not cleared.

Further, at time T(2), when voltage VB is equal to or less than voltage lower limit value VB(1) (YES in S300), there is a divergence between command power Pc and upper limit value Woutf at the time of agreement between voltage VB and voltage lower limit value VB(1) (YES in S302). For this reason, the Winf side correction amount is cleared (S500), and then the Woutf addition processing is executed (S304).

Since the Winf side correction amount is set to zero, the second FB term is an appropriate value for bringing upper limit value Woutf into agreement with command power Pc at the time of agreement between voltage VB and voltage lower limit value VB(1). As a result, the Woutf addition processing is executed appropriately. Therefore, the amount by which voltage VB undershoots voltage lower limit value VB(1) is reduced as compared with a case where the Winf side correction amount is not cleared.

In the above-described manner, with the vehicle according to the present embodiment, the second FB term can be set to an appropriate value by clearing the Winf side correction amount and executing the Woutf addition processing at the time of agreement between voltage VB and voltage lower limit value VB(1). For this reason, the amount by which voltage VB undershoots voltage lower limit value VB(1) can be reduced as compared with a case where the Winf side correction amount is not cleared. Further, the second FB term can be set to an appropriate value by clearing the Woutf side correction amount and executing the Winf addition processing at the time of agreement between voltage VB and voltage upper limit value VB(0). For this reason, the amount by which voltage VB overshoots voltage upper limit value VB(0) can be reduced as compared with a case where the Woutf side correction amount is not cleared. Therefore, a vehicle and a control method for a vehicle which change an input/output limit value more rapidly so that a voltage and/or current does not go beyond an allowable range can be provided.

It is noted that in the present embodiment, although voltage VB of main battery 28 is described as an example of a physical quantity for performing determination of the timing of executing the addition processing and calculation of the correction amounts of upper limit value Woutf and lower limit value Winf, the same applies to a case where current TB is used. For this reason, a detailed description thereof will not be repeated. In addition, when any one of voltage VB and current IB agrees with a limit value first, ECU 200 only has to use the physical quantity in agreement with the limit value to execute determination of the timing of executing the addition processing and the addition processing.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 vehicle; 16 PCU; 18 inverter; 20 boost converter; 24, 36 condenser; 28 main battery; 38 discharge resistance; 44 reactor; 50 resolver; 58, 60, 62, 158 current sensor; 156 battery temperature sensor; 160 voltage sensor; 202, 222 upper limit value determining unit; 204, 224 lower limit value determining unit; 206, 226 divergence determining unit; 208, 228 Woutf determining unit; 210, 230 Winf determining unit; 212, 232 power control unit; 234 clear processing unit.

The invention claimed is:

1. A vehicle comprising:
    a rotating electric machine for generating driving force for the vehicle;
    a power storage device for supplying and receiving electric power to and from said rotating electric machine;
    a detection unit for detecting a physical quantity of at least any one of a voltage and current of said power storage device; and
    a control unit for controlling said vehicle such that required electric power required of said rotating electric machine is satisfied within an allowable range of electric power allowed to be input to and output from said power storage device,
    said allowable range of electric power ranging between a first boundary value and a second boundary value, and
    said control unit bringing a corresponding boundary value into agreement with said required electric power, the corresponding boundary value corresponding to said required electric power and being one of said first and second boundary values, when there is a divergence between said corresponding boundary value and said required electric power at a first point in time when said physical quantity detected by said detection unit agrees with a limit value.

2. The vehicle according to claim 1, wherein
said corresponding boundary value is an upper limit value of said allowable range of electric power when, at said first point in time, an electric power difference between said required electric power and said corresponding boundary value has a magnitude not less than a predetermined value and said required electric power has a positive value, and
said corresponding boundary value is a lower limit value of said allowable range of electric power when, at said first point in time, said electric power difference has a magnitude not less than said predetermined value and said required electric power has a negative value.

3. The vehicle according to claim 1, wherein
said control unit
determines a first correction amount and a second correction amount for an upper limit value and a lower limit value, respectively, of said allowable range of electric power based on a deviation between said physical quantity and said limit value and determines any one of said upper limit value and said lower limit value of said allowable range of electric power depending on determined said first and second correction amounts and on a charging/discharging limit value based on a state of said power storage device,
sets said second correction amount to zero when bringing said upper limit value into agreement with said required electric power at said first point in time, and
sets said first correction amount to zero when bringing said lower limit value into agreement with said required electric power at said first point in time.

4. The vehicle according to claim 1, wherein
said control unit
brings said corresponding boundary value into agreement with said required electric power when there is a divergence between said corresponding boundary value and said required electric power at said first point in time when a first computed value computed using a first coefficient expressing a weight for reflecting said physical quantity detected by said detection unit in a previous value, agrees with said limit value, and
determines a correction amount for said corresponding boundary value based on a deviation between a second computed value computed using a second coefficient expressing a weight for reflecting said physical quantity detected by said detection unit in said previous value, and said limit value, and
said first coefficient is a value having a greater weight than said second coefficient.

5. The vehicle according to claim 1, wherein
said control unit predicts, from an amount of change in said physical quantity, said first point in time that is a predetermined period of time ahead, and when there is a divergence between said corresponding boundary value and a predicted value of said required electric power at predicted said first point in time, said control unit brings said corresponding boundary value into agreement with said predicted value said predetermined period of time prior to said first point in time.

6. The vehicle according to claim 5, wherein
said detection unit is connected in a manner to be able to communicate with said control unit and outputs a signal indicating detected said physical quantity to said control unit, and
said predetermined period of time is a period of time based on a delay in communication between said detection unit and said control unit.

7. A control method for a vehicle used for a vehicle equipped with a rotating electric machine for generating drive force and a power storage device for supplying and receiving electric power to and from said rotating electric machine, the method comprising the steps of:
   detecting a physical quantity of at least any one of a voltage and current of said power storage device;
   controlling said vehicle such that required electric power required of said rotating electric machine is satisfied within an allowable range of electric power allowed to be input to and output from said power storage device; and
   bringing a corresponding boundary value into agreement with said required electric power, the corresponding boundary value corresponding to said required electric power and being one of a first boundary value and a second boundary value of said allowable range of electric power, when there is a divergence between said corresponding boundary value and said required electric power at a first point in time when said physical quantity agrees with a limit value.

* * * * *